(12) United States Patent
Kim et al.

(10) Patent No.: US 7,634,598 B2
(45) Date of Patent: Dec. 15, 2009

(54) DYNAMIC TOTAL ASSET MANAGEMENT SYSTEM (TAMS) AND METHOD FOR MANAGING BUILDING FACILITY SERVICES

(75) Inventors: Hyung Woo Kim, Germantown, MD (US); Christopher William Baker, Stephens City, VA (US); John Raymond Harris, III, Eldersburg, MD (US)

(73) Assignee: Permanent Solution Industries, Inc., Alexandria, VA (US)

( * ) Notice: Subject to any disclaimer, the term of this patent is extended or adjusted under 35 U.S.C. 154(b) by 27 days.

(21) Appl. No.: 11/504,698

(22) Filed: Aug. 16, 2006

(65) Prior Publication Data
US 2007/0043811 A1    Feb. 22, 2007

Related U.S. Application Data

(60) Provisional application No. 60/708,779, filed on Aug. 17, 2005.

(51) Int. Cl.
*G06F 3/00* (2006.01)
*G06F 13/00* (2006.01)

(52) U.S. Cl. .................................. 710/62; 710/2; 710/8
(58) Field of Classification Search ........................ None
See application file for complete search history.

(56) References Cited

U.S. PATENT DOCUMENTS

| | | | |
|---|---|---|---|
| 5,182,705 | A | 1/1993 | Barr et al. |
| 5,765,140 | A | 6/1998 | Knudson et al. |
| 5,799,286 | A | 8/1998 | Morgan et al. |
| 5,893,906 | A | 4/1999 | Daffin et al. |
| 6,049,776 | A | 4/2000 | Donnelly et al. |
| 6,640,212 | B1 | 10/2003 | Rosse |
| 6,742,002 | B2 | 5/2004 | Arrowood |
| 6,745,200 | B2 | 6/2004 | Starkey |
| 6,842,760 | B1 | 1/2005 | Dorgan et al. |

(Continued)

FOREIGN PATENT DOCUMENTS

EP     0 472 786 B1    3/1996

(Continued)

OTHER PUBLICATIONS

Johnson et al., "Guidelines for Quality Assurance Inspection of Commercial Activities Contracts for Real Property Maintenance Activities", USACERL Special Report FF-94/12, Oct. 1993, pp. 2-28.

(Continued)

*Primary Examiner*—Tariq R. Hafiz
*Assistant Examiner*—Scott Sun
(74) *Attorney, Agent, or Firm*—Birch, Stewart, Kolasch & Birch, LLP

(57) ABSTRACT

According to an embodiment, a dynamic system and method for managing facility services that utilize scheduled predefined events and/or unscheduled variable events, are discussed. The dynamic system can include one or more servers, mobile devices, imaging devices, etc. designed and programmed to receive, manage, control, and/or report events from designated users. The dynamic system effectively manages the flow of work, efficiency of work and quality of work, and provides a common platform for communications within organizations, with their customers, and suppliers. The system can be effectively utilized by all service businesses and production operations to manage work flow, improve quality, minimize costs, and maximize labor utilization.

32 Claims, 17 Drawing Sheets

U.S. PATENT DOCUMENTS

| | | |
|---|---|---|
| 2002/0111842 A1 | 8/2002 | Miles |
| 2002/0120459 A1* | 8/2002 | Dick et al. ............... 705/1 |
| 2002/0194045 A1 | 12/2002 | Shay et al. |
| 2003/0018510 A1 | 1/2003 | Sanches |
| 2003/0033184 A1 | 2/2003 | Benbassat et al. |
| 2003/0078798 A1 | 4/2003 | Zaks et al. |
| 2003/0088534 A1 | 5/2003 | Kalantar et al. |
| 2003/0110067 A1 | 6/2003 | Miller et al. |
| 2003/0110070 A1 | 6/2003 | De Goeij |
| 2004/0078257 A1 | 4/2004 | Schweitzer et al. |
| 2004/0107133 A1 | 6/2004 | Pantaleo et al. |
| 2005/0004825 A1 | 1/2005 | Ehrler et al. |
| 2005/0038689 A1 | 2/2005 | Shahoumian |
| 2005/0049903 A1 | 3/2005 | Raja |
| 2005/0060217 A1 | 3/2005 | Douglas et al. |
| 2005/0222889 A1 | 10/2005 | Lai et al. |

FOREIGN PATENT DOCUMENTS

| | | |
|---|---|---|
| WO | WO-01/61552 A2 | 8/2001 |

OTHER PUBLICATIONS

Barbara J. Stevens, "Delivering Municipal Services Efficiently: A Comparison of Municipal and Private Service Delivery", Ecodata, Inc., Jun. 1984, pp. I-II, i-v, 1-42.

Michaud et al., "A Web-based System for Maintaining A Departmental Personnel List and Telephone Directory", The Journal of Computing in Small Colleges, vol. 15, No. 3, Mar. 2000, pp. 66-76.

Mendes et al., "A Comparative Study of Cost Estimation Models for Web Hypermedia Applications", Empirical Software Engineering, vol. 8, 2003, pp. 163-196.

* cited by examiner

DYNAMIC TOTAL ASSET MANAGEMENT SYSTEM (TAMS) AND METHOD FOR MANAGING BUILDING FACILITY SERVICES

This Nonprovisional application claims priority under 35 U.S.C. § 119(e) on U.S. Provisional Application No. 60/708,779 filed on Aug. 17, 2005, the entire contents of which are hereby incorporated by reference.

BACKGROUND OF THE INVENTION

1. Field of the Invention

The present invention generally relates to a dynamic system for managing tasks and task-related information, and more specifically to a dynamic system and method for managing building facility services and other services that utilize scheduled predefined events and/or unscheduled variable events. More particularly, the invention relates to a dynamic system and a method for managing work flow, work efficiency, and work quality using data transfer between a server computer and a plurality of mobile devices, imaging devices, and/or computers designed and programmed to receive, define, manage, control, and/or report events from designated users.

2. Description of the Background Art

Managing building facility services typically involves multiple processes, departments, systems, and personnel that have suffered from no or poor integration in the past. Conventional systems focus on the primary process of performing physical work (work orders or tasks) that are used in and around buildings to define the way things are intended to be done. However, this is only one aspect of managing building facility services. To have an effective and efficient system, companies need to define, measure, and track labor resources, material resources, contract deliverables, union requirements, financial objectives, quality expectations, incentives, how to perform the work, and more from one system. In conventional systems, however, most of these objectives are managed manually (or some are not managed at all), incurring high labor costs, or are partially done with only rudimentary work order automated processes and little to no system integration, which is a problem.

There are computer-implemented systems that attempt to manage work orders, provide rudimentary quality assurance, and communicate with vendors. However, these systems are very limited in scope, and require heavy user intervention and user involvement. Also, these systems fail to integrate all of the system components that are needed to provide an effective and efficient service, which is a problem.

SUMMARY OF THE INVENTION

The present invention achieves the objectives that are necessary to define, communicate, track, manage, and report on business goals.

One object of the present invention to provide a comprehensive, integrated, dynamic system and method for automatically, effectively, and efficiently managing building facility services and other types of task requiring services with minimal or no user intervention and with complete mobility.

Another object of the present invention is to provide computer software that can run on hardware (e.g., server, portable device, etc.) that allows comprehensive and automated integration and management of information used to provide building facility services and other types of task requiring services.

Another object of the present invention is to provide portable connectivity to aspects of the entire building facility (or other task requiring) services process, which allows users to perform their duties from anywhere in the world at any time.

Still another object of the present invention is to provide a common communications platform for all aspects of building facility (or other task requiring) services and a method that permits simple and quick communications between every user, whether they are office based or mobile and whether they are a customer, an employee, a vendor, a consultant, a regulatory agency, a quality control inspector, an investor, or other interested party.

Yet another object of the present invention is to provide automation features to daily work flow that define, select, quantify, measure, process, manage, and/or report status changes that are of interest to designated users (e.g., managers) to improve efficiency.

A further object of the present invention is to provide a system and method for defining, measuring, managing, and reporting employee work efficiency to improve daily operations and maximize financial returns.

Another object of the present invention is to provide a system and method for managing building facility (or other task requiring) services, which address the limitations and disadvantages associated with the background art.

According to one aspect, the present invention provides a dynamic system for managing tasks to be completed, the system comprising at least one server; and at least one portable device configured to communicate with the at least one server, wherein a first device among the at least one server and the at least one portable device generates work orders, automatically creates a work order schedule based on at least the work orders, and transmits work-related information including the work order schedule and/or the work orders to at least one second device among the at least one server and the at least one portable device.

According to another aspect, the present invention provides a dynamic system for managing labor resources, the system comprising: at least one server; and at least one portable device including an image capturing unit configured to capture an image of a user and configured to communicate with the at least one server, wherein the at least one portable device transmits the captured images of the users with other user data to the at least one server; and the at least one server receives the other user data and the captured images of the users, and automatically generates and stores employee record files of the users based on the received user data and captured images.

According to another aspect, the present invention provides a dynamic system for managing tasks to be completed, the system comprising at least one server; and at least one portable device configured to communicate with the at least one server, wherein a first device among the at least one server and the at least one portable device generates quality assurance instructions, automatically creates a quality assurance schedule based on at least the quality assurance instructions, and transmits quality assurance information including the quality assurance schedule and/or the quality assurance instructions to at least one second device among the at least one server and the at least one portable device.

According to another aspect, the present invention provides a portable communication device for managing tasks to be completed, the device comprising a communication unit configured to communicate with other devices via a network; and a controller configured to generate work orders, to automatically create a work order schedule based on at least the work orders, and to transmit work-related information including the work order schedule and/or the work orders to the other devices via the network.

According to another aspect, the present invention provides a portable communication device for managing tasks to be completed, the device comprising a communication unit configured to communicate with other devices via a network; and a controller configured to generate quality assurance instructions, to automatically creates a quality assurance schedule based on at least the quality assurance instructions, and to transmit quality assurance information including the quality assurance schedule and/or the quality assurance instructions to the other devices via the network.

According to another aspect, the present invention provides a dynamic system for managing work performance and/or work conditions, the system comprising: at least one server, and at least one portable device including an image capturing unit configured to capture an image of work performance and/or work conditions and configured to communicate with the at least one server, wherein the at least one portable device transmits the captured images of the work performance and/or work conditions with other work data to the at least one server; and the at least one server receives the other work data and the captured images of the work performance and/or work conditions, and automatically generates and stores work record files of the work performance and/or work conditions on the received work data and captured images.

According to another aspect, the present invention provides a dynamic system for managing work quality and/or quality conditions, the system comprising: at least one server; and at least one portable device including an image capturing unit configured to capture an image of work quality and/or quality conditions and configured to communicate with the at least one server, wherein the at least one portable device transmits the captured images of the work quality and/or quality conditions with other quality data to the at least one server, and the at least one server receives the other quality data and the captured images of the work quality and/or quality conditions, and automatically generates and stores quality record files of the work quality and/or quality conditions based on the received quality data and captured images.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
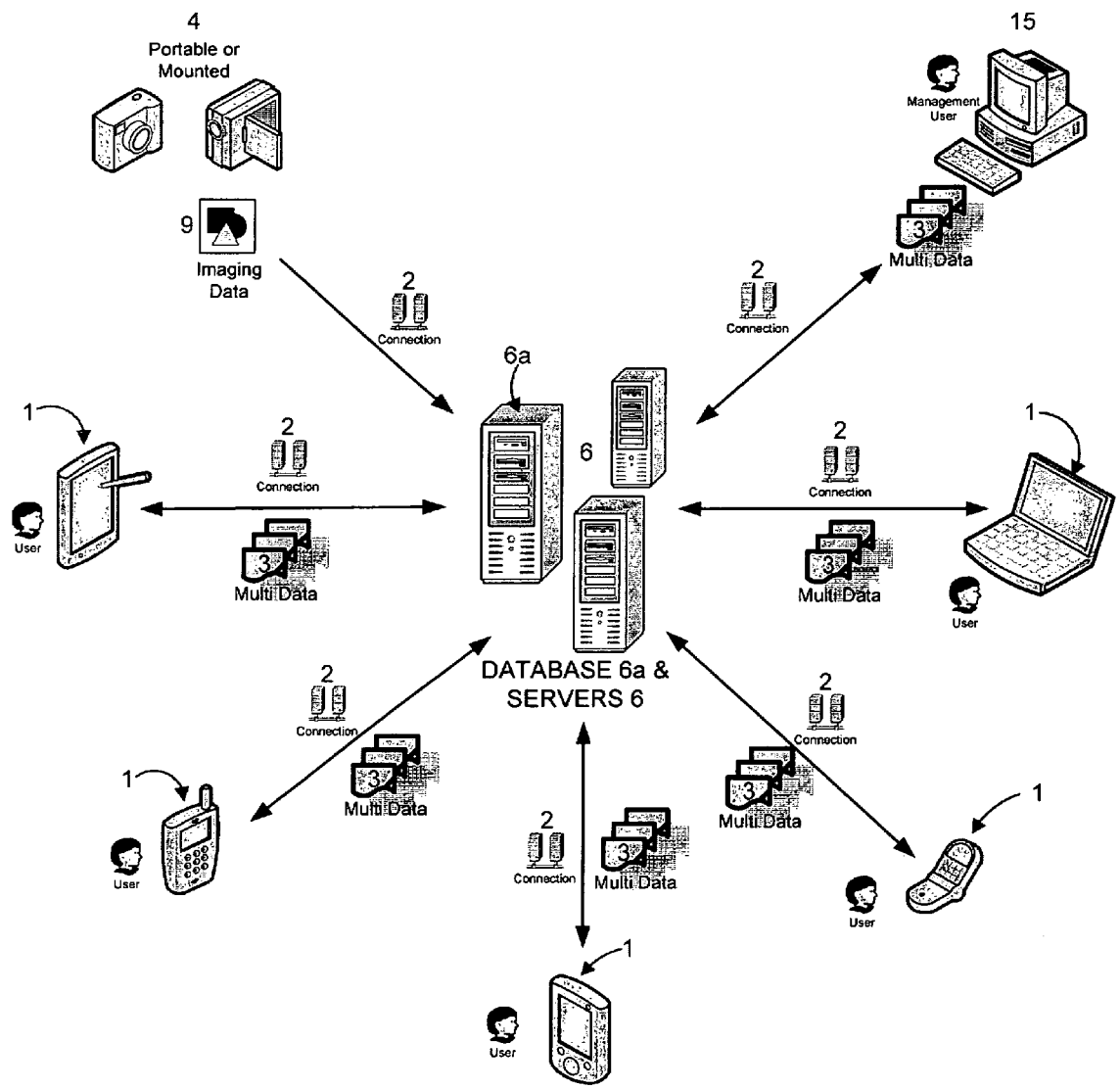
FIG. 1 is an exemplary schematic diagram of a dynamic system according to an embodiment of the present invention.

The present invention encompasses a dynamic system and method for managing events that transpire throughout the work day in facilities or other places; the system or method being of the type that utilizes scheduled predefined events and/or unscheduled variable events to carry out managing building facility services and other services. The dynamic system can include one or more servers, mobile devices, imaging devices, and/or computers designed and programmed to receive, manage, control, and/or report events among designated users. The dynamic system further communicates via both hard wired and/or wireless connection means with one or more designated users, each of which can have a unique login identity (e.g., ID and password). The dynamic system effectively manages the flow of work, efficiency of work and quality of work, and provides a common platform for communications within organizations, with their customers, and suppliers.

In the present application, whenever the term "dynamic system" is used, it should be understood that it can mean only the computer software that provides the operations discussed, and that such computer software can run any hardware.

The dynamic system can be effectively utilized by all service businesses to manage work flow, improve quality, and maximize labor utilization. Some of the applications for the dynamic system include, but are not limited to: janitorial services, facility maintenance services, engineering services, landscaping services, plumbing services, electrical services, snow removal services, construction services, pool maintenance services, property management, security services, medical services, waste removal services, and employee dispatch operations.

Schedule

According to the present invention, the dynamic system can be utilized for multiple locations, multiple buildings, and/or multiple customers.

Work Order Schedules—the dynamic system of the present invention automatically generates and updates work orders from the tasks to be performed on a periodic basis (or as desired) to achieve the desired performance of workers. Work orders can include a set of specific instructions and other information (e.g., job location, equipment needed, etc.) to get each of the work orders completed. The dynamic system of the present invention also schedules the work orders based upon, e.g., their desired start time and frequency and any other requirement and thereby automatically generates and updates a work order schedule. The work order schedule can be a schedule of one or more jobs and indicates information pertaining to the job(s) schedule such as who will do what job, when and with what equipment, etc. Projects or work can be scheduled directly into the work order schedule as needed. In contrast, conventional systems have inefficient batch oriented or static work order schedules that demand excessive labor resources to provide individual route schedules or work instructions that are provided one at a time.

The present invention dramatically improves work efficiency and communications by continuously providing dynamic (e.g., can be updated constantly in real time or as requested) work order schedules that can be automatically sent, viewed, and/or modified utilizing the portable devices such as a PDA, a mobile phone, a laptop computer, a smart phone, etc.

Quality Assurance Schedule—conventional systems utilize inefficient static quality assurance schedules that demand excessive labor resources to provide individual route schedules. In contrast, the quality assurance schedule of the present invention can be automatically generated and/or directed by closing work orders utilizing the portable devices, thereby dramatically improving work efficiency and communications by continuously providing dynamic quality assurance schedules that can be automatically sent, viewed, and/or modified. The quality assurance schedule can be a schedule of quality assurance (quality control) inspections of the work orders once the work orders are initially finished. Some work actually requires that such inspection be made by a certain time period according to the requirements. The dynamic system of the present invention also automatically manages the quality control process. According to an embodiment, the dynamic system of the present invention can utilize random sequence generators with weighted results to improve spot checking performance. The quality assurance schedule can be directed entirely in random fashion, or can be implemented on a predetermined schedule, or a mix of both. Quality assurance can also be performed without a schedule, or a combination of scheduled and unscheduled.

Employee Timekeeping Status Changes on Work Order and/or Quality Assurance Schedules—conventional systems do not tie employee attendance to work orders, which seriously detracts from work performance without excessive labor resources to track employee rosters each shift. Utilizing the present invention, if an employee is early or late beyond a pre-set time, or does not show for work, such employee timekeeping information (or status change information) is automatically utilized by the dynamic system of the present invention such that the work orders scheduled for that employee can visually change (e.g., change in text, color, font, graphics, messages, etc.), automatically, in the work order schedule (or quality assurance schedule if the worker is a quality assurance worker) and/or also in the specific work order or quality assurance inspection order that the employee was responsible to complete. Visual changes can also be accompanied by messages and/or audio cues, or messages and/or audio cues can be used alone. The automation in tracking and notification of employee timekeeping status changes of the present invention greatly improves work efficiency and work performance quality.

In addition, the present invention allows work order status changes to be highlighted by visual changes in the work order schedule (text, color, font, graphics, messages, etc.). In contrast, conventional systems do not automatically show work order status changes, which is inefficient and demands excessive labor to maintain communications. Utilizing the present invention, as work progresses throughout the day, work order status changes are automatically tracked graphically on the work order and/or quality assurance schedules for each work order. Some of the status designations the dynamic system can utilize are, but not limited to: Requested, Open, On-Hold, Cancelled, Completed, Re-Work, and No-Show. Visual changes can also be accompanied by messages and/or audio cues, or messages and/or audio cues can be used alone. The automation in tracking and notifying work order status changes of the present invention greatly improves work efficiency and communications.

Further, conventional systems do not account for varied work efficiency of individual employees or work crews, which leads to poor work planning and excessive use of labor to complete work orders. In contrast, the present invention automatically adjusts the work order schedule based on the efficiency rating (e.g., work efficiency, attendance, etc.) of each employee on each work order and/or entire work crews on each work order. The automation in tracking and calculation of the work efficiency of the present invention greatly improves work efficiency and allows for enhanced tracking of individual and group efficiency dynamics.

Work Order

Conventional systems utilize inefficient batch oriented or static work order instructions to communicate work requirements. In contrast, in order to facilitate rapid communication and minimize human intervention, the dynamic system of the present invention can automatically send, receive, view and/or modify work orders and work order instructions utilizing the portable devices. The automation in providing dynamic work instructions greatly improves work efficiency and communications.

In conventional systems, pictures and other image data may be physically attached (e.g., stapled) to the work order or work order instructions to allow a worker to complete the job, and thus the conventional systems do not allow for on-site determinations of issues and documentation of events. In contrast, to speed up developing and completing work order instructions, the dynamic system of the present invention allows for on-site determinations of issues and provides improved documentation of events, by providing the capability to automatically send and/or receive imaging data (e.g., pictures, diagrams, etc.) related to the work/inspection, directly into a work order (or quality assurance order) record or the server/database by utilizing the portable devices.

Also conventional systems do not track work order status, which greatly inhibits communication of work completion and management of resources that may be required to intervene should work orders be delayed, and do not provide efficiency metrics. In contrast, by automatically opening and/or closing scheduled and/or unscheduled work orders utilizing the portable devices, the dynamic system of the present invention can track a work order through its life cycle as it moves through different stages such as Requested, Open, On-Hold, Ready to QC (quality control), Cancelled, Re-Work, Completed, and other stages. In addition, by collecting the actual start times and end times for work order completions, the dynamic system of the present invention can automatically calculate the actual costs associated with the work and compare it to budgeted costs, whereby cost analysis for each work completed or to be done can be automatically generated. Further, the dynamic system of the present invention can automatically determine employee work efficiency metrics for individuals and/or groups with actual work order completion metrics. Notifications of work progress to designated users (e.g., managers, etc.) can also be provided automatically by the dynamic system of the present invention so as to improve communications and facilitate better planning of available resources.

The present invention also includes a graphical display of work order status, allowing users (e.g., managers, field works on the current job or other job, inspectors, etc.) to view all work orders and their status, or drill down to an individual work order. The dynamic system of the present invention can also include work order integration with conventional clock in/clock out type of hardware & software to graphically designate late or no-show employee status for each designated work.

In addition, according to the present invention, work order time to completion can be automatically calculated to determine the employee labor efficiency rating (e.g., how efficient is the employee in completing a task) for each employee scheduled to complete the work and/or their associated work crews. This greatly enhances the ability to predict actual work completion times to improve efficiency of allocation of the available resources.

Furthermore, according to the present invention, time to completion and budgeting can be automatically updated by the dynamic system for each employee scheduled to complete a task.

Quality Assurance

Conventional systems utilize inefficient batch oriented or static quality assurance instructions to communicate quality assurance requirements. In contrast, in order to facilitate rapid communication and minimize human intervention, the dynamic system of the present invention can automatically send, receive, view and/or modify quality assurance (quality control) inspections and quality assurance instructions utilizing the portable devices. The automation in providing the dynamic quality assurance instructions greatly improves work efficiency and communications.

Conventional systems utilize static imaging data in quality assurance instructions that do not allow for on-site determinations of issues and documentation of events. In contrast, in order to speed up developing and completing quality assurance instructions, allow for on-site determinations of issues, provide improved documentation of events, provide targeted corrective action, and improve training protocols, the dynamic system of the present invention can automatically send and/or receive imaging data directly into a quality assurance inspection record utilizing the portable devices.

Conventional systems do not tie at all the quality assurance inspections to the work order schedule, which is inefficient and greatly inhibits communication of work completion. In contrast, according to the present invention, quality assurance can be directly tied to work performed in the work order schedule. When a work order closes (e.g., the work is initially finished by a worker), the dynamic system of the present invention automatically opens a corresponding quality assurance inspection order in the quality assurance schedule, and automatically notifies appropriate quality assurance inspectors and/or other designated system users of available inspection sites, e.g., by directly updating their quality assurance schedules or sending an e-mail to them. This is extremely helpful to the quality assurance inspectors who wish to inspect finished work and to improve their work efficiency. It is also helpful to other designated system users (e.g., managers, etc.) who wish to track the progress of work throughout a facility.

Conventional systems do not track the quality assurance inspection status (status indicating the progress on the quality control inspection), which greatly inhibits communication of work completion and management of resources that may be required to intervene should work orders fail the inspection, and do not provide efficiency metrics. In contrast, by automatically opening and/or closing scheduled and/or unscheduled quality assurance inspections utilizing the portable devices, the dynamic system of the present invention can automatically track each quality assurance inspection through its life cycle as it moves through different stages such as Requested, Open, On-Hold, Cancelled, Re-Work, Completed, and other stages. In addition, by collecting the actual start times and end times for the quality assurance inspection completion, the dynamic system of the present invention can automatically generate the actual costs associated with a job, and compare it with budgeted costs for financial analysis. According to the present invention, also, employee work efficiency metrics can be automatically determined for individuals and/or groups with actual quality assurance inspection completion metrics using the time and other status information. Further, according to the present invention, instant notifications of work progress to the designated users can be provided, which provides improved communications and facilitates better planning of the available resources.

In addition, if a quality assurance inspection fails, the dynamic system of the present invention can automatically notify designated users (e.g., system administrators, managers, etc.) of the failed quality assurance inspection, and then automatically reschedule the work by generating a Re-work work order, so that the work can be completed properly. The dynamic system can automatically notify the designated users of the scheduled Re-work work order to provide and/or clarify a corrective action and improve response times. This greatly improves work efficiency, response times, and communications to complete the job properly.

Employee Management

Conventional systems utilize inefficient batch oriented or static employee rosters to communicate work assignments. In contrast, in order to minimize human intervention, better plan the work day, and determine which employees to place on specific tasks, the dynamic system of the present invention can automatically send, receive, view, and/or modify employee rosters utilizing the portable devices. The employ roster can indicate each employee's schedule, e.g., who showed up for what task, etc. The automation in providing the dynamic employee rosters greatly improves work efficiency and communications.

Conventional systems utilize static imaging data in employee profiles that do not allow for on-site security determinations. For instance, in a conventional system, an ID picture of an employee may be physically placed inside the employee's personal file folder. In contrast, in order to speed up creating and updating employee profiles (e.g., employee personal/contact information) and/or security identification (e.g., security clearance for an employee), the dynamic system of the present invention can automatically send and/or receive imaging data directly and electronically into an employee record (or a work and/or quality assurance record) utilizing the portable devices.

In addition, according to the present invention, a complete work order schedule for each employee is stored in their electronic employee profile to aid in changes of personnel within the dynamic system.

Inventory

According to the present invention, all supplies and equipment for each location can be electronically stored in the dynamic system, including a vendor's inventory at the vendor's warehouses. For instance, this can be accomplished by using a vendor managed inventory process of the dynamic system.

Conventional systems utilize inefficient batch oriented or static inventory management systems to communicate current inventory levels and demand excessive labor resources to provide adequate materials for the scheduled work orders. In contrast, in order to minimize human intervention, better plan inventory requirements, and improve inventory carrying costs, the dynamic system of the present invention can automatically update the inventory levels of supplies and equipment when a work order is planned/generated or has been completed. For instance, when the work is completed according to a particular work order, the dynamic system can automatically deduct specific levels of supplies specified in the work order from the total inventory levels of supplies and equipment. As a result, the dynamic system automatically determines if adequate inventory is available to complete other scheduled tasks, which can include materials on order, and can notify designated users (e.g., administrators, managers, etc.) about the inadequate inventory levels for the other work orders before they are to be completed. Thus, using the dynamic system, appropriate levels of supplies and equipment can be automatically ordered to ensure completion of subsequent work orders or re-work work orders. This greatly reduces work stoppages due to inadequate inventory, and allows for more efficient planning of material purchases. When work is performed, the dynamic system automatically reduces the inventory appropriately, which can allow automatic generation of purchase orders to be sent by the system based on established re-order points. This helps ensure that materials are always available to perform all scheduled work.

Exemplary embodiments of the present invention will now be described by referring to the drawings, which are part of the present invention.

FIG. 1 illustrates a dynamic system according to an embodiment of the present invention. An overview of the interaction between devices and designated users of the dynamic system can be viewed in FIG. 1. The present inventors also refer to the dynamic system as TAMS (Total Asset Management System).

Referring to FIG. 1, the dynamic system includes one or more servers 6, a database 6a that is run on the server(s)/computer(s) 6, and one or more portable devices 1 and one or more non-portable devices 15 such as desktop computers, for communicating with the servers 6 via appropriate connections 2 such as a wired connection and/or a wireless connection including, e.g., via the Internet, an intranet, an extranet, or other network. In the present application, although it may not be specified, the servers 6 means the servers 6a including the database 6a. All the components of the dynamic system are operatively coupled and configured.

The database 6a stores therein computer software program(s) that implements all the operations/processes/steps of the dynamic system, and other data (e.g., work orders, work order schedules, quality assurance schedules, employee rosters, etc.) that is generated by the dynamic system. The present inventors refer to such software program as TAMS program, which can be written using computer programming languages. TAMS program (database, etc.) may be available at Permanent Solution Industries (PSI) Inc. associated with the present inventors. Such computer program(s) may be stored in portable or other types of storages or memories such as hard drive, RAM, ROM, PROM, etc. associated with one or more servers 6 and/or portable devices 1 and/or non-portable devices 15. Alternatively, such computer program(s) may be stored in a different storage medium such as a USB, magnetic disc, optical disc, magneto-optical disc, etc. Such computer program(s) may also take the form of a signal propagating across the Internet, extranet, intranet or other network and arriving at the destination device for storage and implementation.

The database 6a resides on the server(s) 6, but if desired, can be separate storage medium(s) accessible by the servers 6. The portable devices 1 can be, but are not limited to, computers, handheld Personal Digital Assistants (PDAs), cell phones, cell phone PDAs, cell phones with camera, cell phone PDAs with camera, measurement devices, and tracking devices. One or more users are associated with each of the portable devices 1 and non-portable devices 15, and such users can be, but are not limited to, employees, vendors, contractors, field workers, inspectors, managers, administrators, etc. Some users may only be able to access only certain information from the database 6a using the portable and non-portable devices 1, 15, e.g., for security reasons or because such information is not appropriate for that particular user. As such, a user may need to login properly to access some information from the database 6a. Generally, the non-portable devices 15 can be used by supervisors, managers, administrators, coordinators, etc. at an office or other central location. For instance, a field worker carrying a PDA (1) can go to a remote location of a building/facility to complete a task, and communicate with a system administrator/manager the status of the work by transmitting information from the field worker's PDA to either a desktop computer (15) of the manager at the office or a mobile terminal (1) of the manager at another remote location.

The servers 6 (including the database 6*a*) can automatically capture, store, translate, calculate and/or communicate a wide variety of data 3, 9 over the Internet or other wired or wireless connections 2, to the portable devices 1 and the non-portable devices 15. Similarly, each of the portable devices 1 and the non-portable devices 15 can also automatically capture, store, translate, calculate and/or communicate over the Internet or other wired or wireless connections 2 a wide variety of data 3, 9 to the servers 6 (including the database 6*a*) and/or to other portable devices 1 and/or to other non-portable devices 15, e.g., via email, fax and/or graphic representation and/or sound utilizing computers and/or devices, etc. Appropriate computer software is loaded in each of the portable devices 1 and the non-portable devices 15 to enable such communication and processes of the dynamic system.

Data 3 can be, but is not limited to, work orders, re-work work orders, employee rosters, employee records, labor information, directions, schedules (e.g., work order schedules, re-work work order schedules, quality assurance schedules, etc.), work/employee efficiency information for employees, instructions (e.g., work order instructions, re-work work order instructions, quality assurance instructions, etc.), quality assurance records, quality assurance status, measurements, results of tests such as quality assurance tests, directives, tracking data, schematics, graphics, feedback, change orders, quality assurance specifications, inventory status, service call requests & follow-ups, and sound communication. The imaging data 9 can be, but is not limited to, pictures, video, and surveillance images, and each of the portable and non-portables devices 1 and 15 can generate, transmit, and receive such imaging data to and from the servers 6 utilizing the database 6*a* and other devices 1 and 15. The data 3 can include the imaging data 9, e.g., the work order can include embedded pictures showing how the job should be done. Designated users of the dynamic system interact with the dynamic system using the portable and non-portable devices 1 and 15 to send and/or receive the data 3 and/or imaging data 9 to improve work flow, planning, efficiency, and management of resources.

FIGS. 2-17 illustrate different examples of various operations of the dynamic system of FIG. 1 according to the present invention. Such examples are not mutually exclusive and can be combined as desired. Although it may not specifically shown in each of the figures, any data communicated amongst the servers 6, the database 6*a*, the portable devices 1 and the non-portable devices 15 in each of FIGS. 2-17 can include imaging data, multimedia data, audio data, or any other types of data. Also any change in the data (e.g., schedule change, work order change, etc.) can be emphasized to users by, e.g., change in color, text, font, etc. of the data or by some other means.

Figure 2:
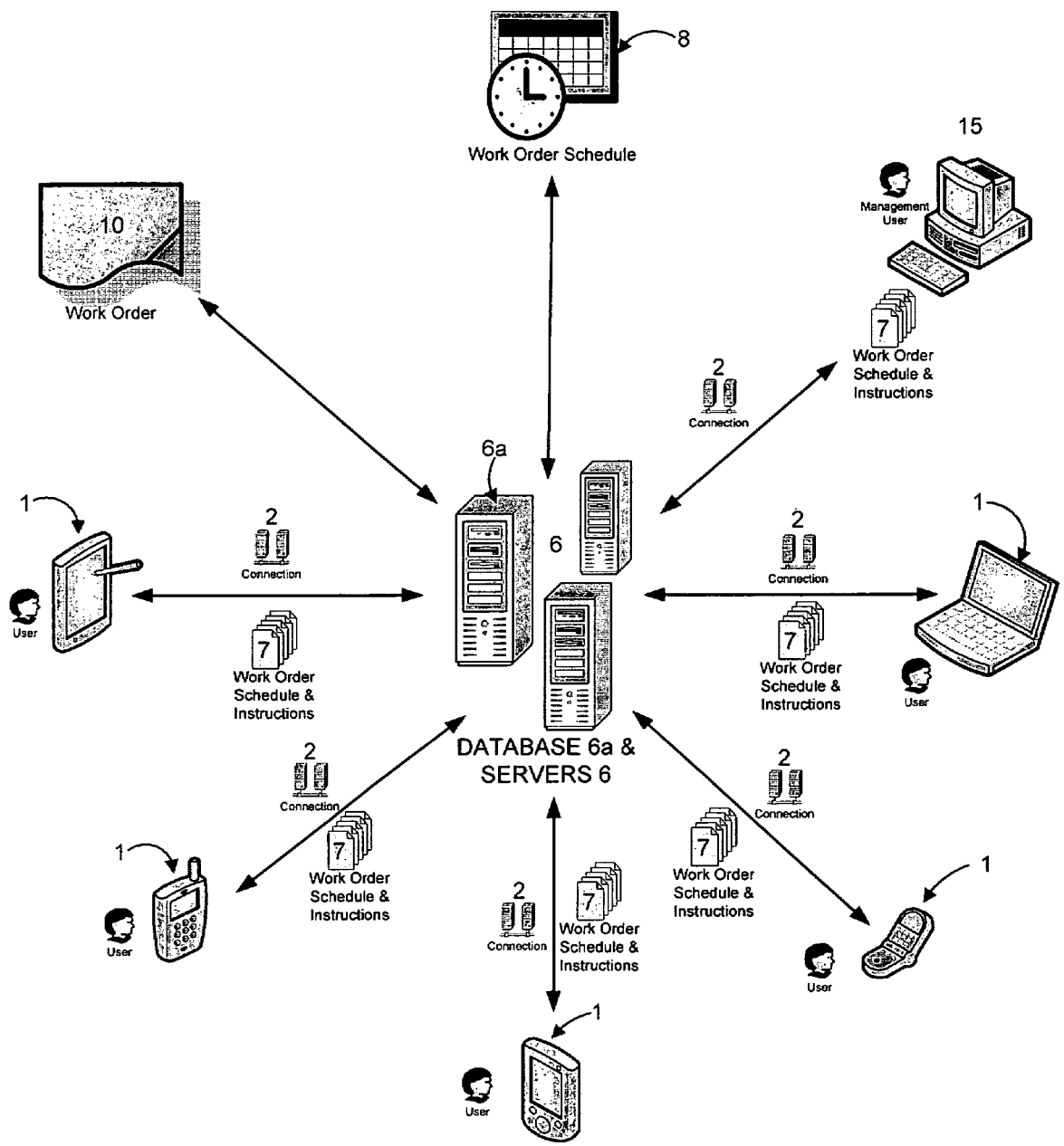
FIG. 2 is a flow diagram of automatically sending and/or receiving work order instructions, including work order schedules utilizing portable devices in the dynamic system according to the present invention.

Particularly, FIG. 2 illustrates an example of an operation of automatically communicating work orders, work order instructions, and/or work order schedules in the dynamic system according to an embodiment of the present invention.

As shown in FIG. 2, a plurality of different work orders 10 are electronically stored in the database 6*a*. The work order 10 can include the description of the work to be done, a location of the work to be done, time information (e.g., desired start time and duration, etc.) of the work, equipment and supplies needed, etc. Then based on the work orders 10 and/or the employee information (e.g., who is available, who is near the work location, etc.) stored in the database 6*a*, which will be discussed in detail later, the servers 6 utilizing the database 6*a* automatically generate work order schedules 8. The work order schedule 8 is a schedule of work to be done and indicates schedule information such as which worker(s)/crew(s) will do which work. One work order schedule 8 can be tailored for one specific worker or crew (e.g., for individual use), or can include a schedule of different work to be done by different workers and crews (e.g., for managerial use). The servers 6 utilizing the database 6*a* can also consider any other information (e.g., security clearance information of employees) as needed to assign workers to different jobs to be completed.

Then the servers 6 can automatically send work order information 7 (e.g., work orders 10, work order schedules 8, work order instructions, changes to each, etc.) from the database 6*a* to the portable device(s) 1 and/or the non-portable device(s) 15 using the connections 2 (e.g., via a network, wired connection, wireless connection, etc.). The work order information 7 such as the work order schedules 8 and work orders 10 reside in the database 6*a* and can reside in the portable and non-portable devices 1 and 15. Changes (as part of the work order information 7) to the work order schedules 8 and/or work orders 10 can be instantly or periodically (or upon request by a user) communicated to the portable and non-portable devices 1 and 15. The work order information 7 can include, but is not limited to, schematics, operating instructions, repair instructions, cleaning instructions, specifications, material requirements, part requirements, resource availability, due dates & times, scheduling conflicts, scheduling changes, route schedules and past due work. A user at the portable device 1 (e.g., a manager, a field worker, a crew leader, etc.) can receive the work order information 7 and carry out (or manage) the jobs according to the received work order information 7. The status of the work progress (e.g., actual start and end time of the job, who is working, job completed or not, etc.) can also be sent from the portable device 1 to the servers 6 and/or to the other portable and non-portable devices 1 and 15.

Accordingly, the present invention allows all users of the dynamic system to receive and access current work-related information at any time and place, and allows the system to automatically assign and allocate human and other resources to the jobs to be done and to keep a current record of all job status and resource allocations. Thus, there is no or minimal human intervention in the present invention and an effective total management system is provided.

Figure 3:
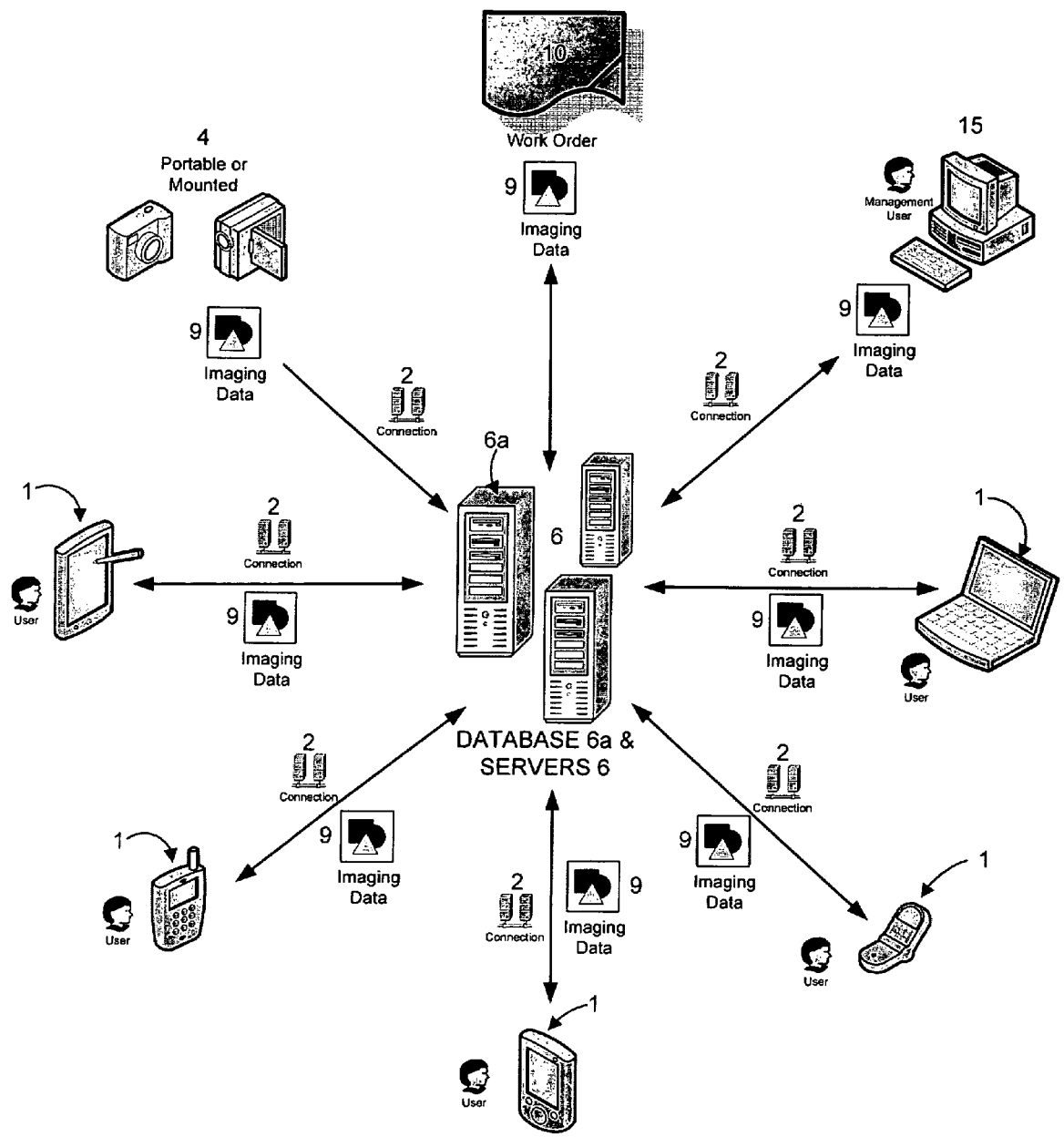
FIG. 3 is a flow diagram of automatically sending and/or receiving imaging data that is stored directly into a work order record utilizing portable devices in the dynamic system according to the present invention.

FIG. 3 illustrates the automatic flow of the imaging data 9 via the connections 2 to and from the servers 6, which are captured and/or created utilizing the portable devices 1 and/or imaging devices 4 (e.g., cameras, etc.) which can be part of the portable devices 1. The imaging data 9 can be directly part of the work order information 7 of FIG. 2 and can be communicated amongst the servers 6, the portable devices 1 and the non-portable devices 15 through the connections 2, via, e.g., email, fax and/or graphic representation utilizing computers and/or devices, etc. For instance, schematics/images of work instructions can be electronically embedded directly in the work order and sent from the servers 6 to the portable and non-portable devices 1 and 15. Such imaging data 9 can clarify the work order information by functioning as a visual aid. Also, a field worker/manager can take a picture of a work or work progress using the portable device 1 and send it to the servers 6 for storage in the database 6*a* and other use. Such imaging data can be electronically tied to the specific work, work order, or worker as needed. Accordingly, the dynamic system of the present invention can recognize various imaging data 9 and store it appropriately in the database 6*a* automatically to provide clarified work instructions utilizing pictures, schematics, diagrams and/or graphics that can improve work instructions, clarify work requirements, provide examples of good or poor workmanship, document on-site work conditions, document work progress, highlight safety hazards, and/or provide proof of work completion.

Figure 4:
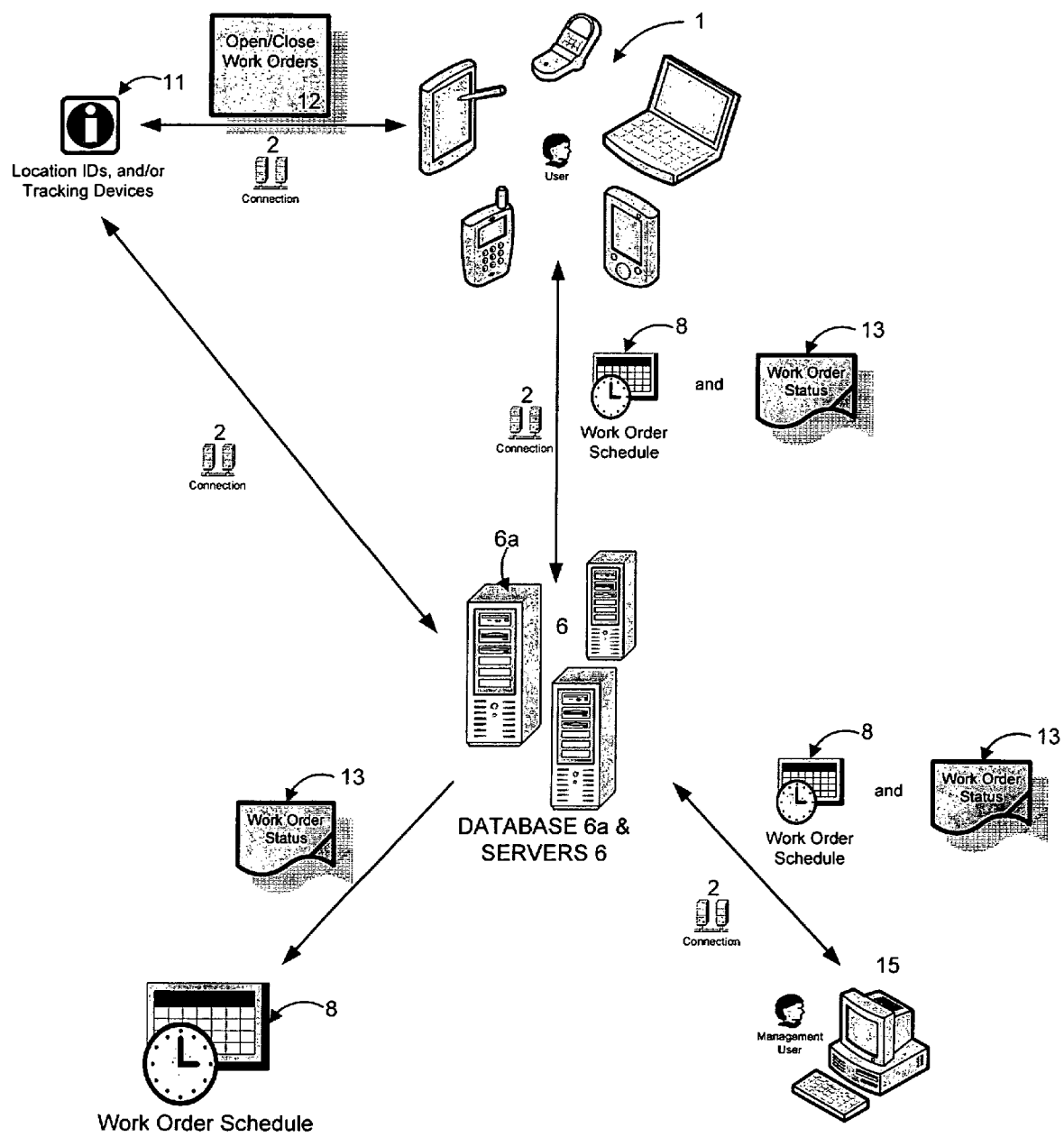
FIG. 4 is a flow diagram of automatically opening/closing scheduled and/or unscheduled work orders utilizing portable devices, and automatically updating work order schedules utilizing portable devices in the dynamic system according to the present invention.

FIG. 4 illustrates an example of an operation of automatically opening and closing scheduled and/or unscheduled work orders 12 utilizing the portable devices 1 and location identification tags and/or tracking devices 11 according to an embodiment of the present invention.

As shown in FIG. 4, when a user (e.g., a field worker, a manager, etc.) arrives at a particular location where a job is to be performed, the user can indicate his arrival time and availability using a location identification tag and/or tracking device 11. For instance, the user can scan his ID badge having a barcoded user information into a bar code reader/computer 11 located in the job location or using his portable device 1 and/or scan a location and/or equipment tag that contains encoded information. Then the bar code reader 11 transmits this information (e.g., user's identity, scanned time & date, scanned location, scanned equipment identification, etc.) to the servers 6 directly, or to the portable device 1 and then the servers 6 via the connections 2. The servers 6 can then automatically retrieve or update the work order, work order instructions, and/or work order schedule for the identified user in the database 6a. For instance, the servers 6 can automatically retrieve and open (12) (and update) the appropriate work order with work instructions for the identified user, and transmit the retrieved information to the user (to the user's portable device 1) in the job location, so the user can carry out the job according to the work instructions and orders. In the similar manner, the user can scan out when the work is finished using the device 11 and the servers 6 can update the completion of the work in the database 6a, e.g., the servers 6 can close (12) the work order as being completed. Similarly, other statuses of the work can be communicated within the dynamic system and examples of such statuses can be, but are not limited to: Requested (work is requested and scheduled, but not done), Open (work has begun), On-Hold (work is on hold), Cancelled (work is cancelled), Completed (work is completed), and Ready to Quality Control (work is finished and ready for quality control inspection). The user may be able to enter different statues of the work into the device 11 or the portable device 1 in a variety of ways, e.g., by selecting a menu item, scanning an appropriate label, etc. All such work order status information 13 (e.g., different statuses of the work, etc.) can be transmitted (automatically or upon request) to any other portable or non-portable device 1 or 15 via the connections 2, so other users in the system can know of the work status information.

Accordingly, the dynamic system of the present invention can automatically and track and update the work progress and employee movement throughout the day, by changing the work order status information 13 and/or updating the work order schedules 8 and automatically sending/receiving the work order status information 13 and/or the work order schedules 8 over the Internet or other wired or wireless connections 2 to and/or from the database 6a, and/or portable devices 1 and/or non-portable devices 15, via, e.g., email, fax and/or graphic representation and/or sound utilizing computers and/or devices, etc.

The location tags and/or tracking devices 11 can be, but are not limited to, barcodes and barcode readers (PDA, Wand, and/or Hand Held), RFID tags & sensors, equipment sensors, security sensors, and satellite integrated portable tracking devices like GPS cell phones and GPS cell phone PDAs. Such a tracking device 11 can be part of a portable device 1.

Figure 5:
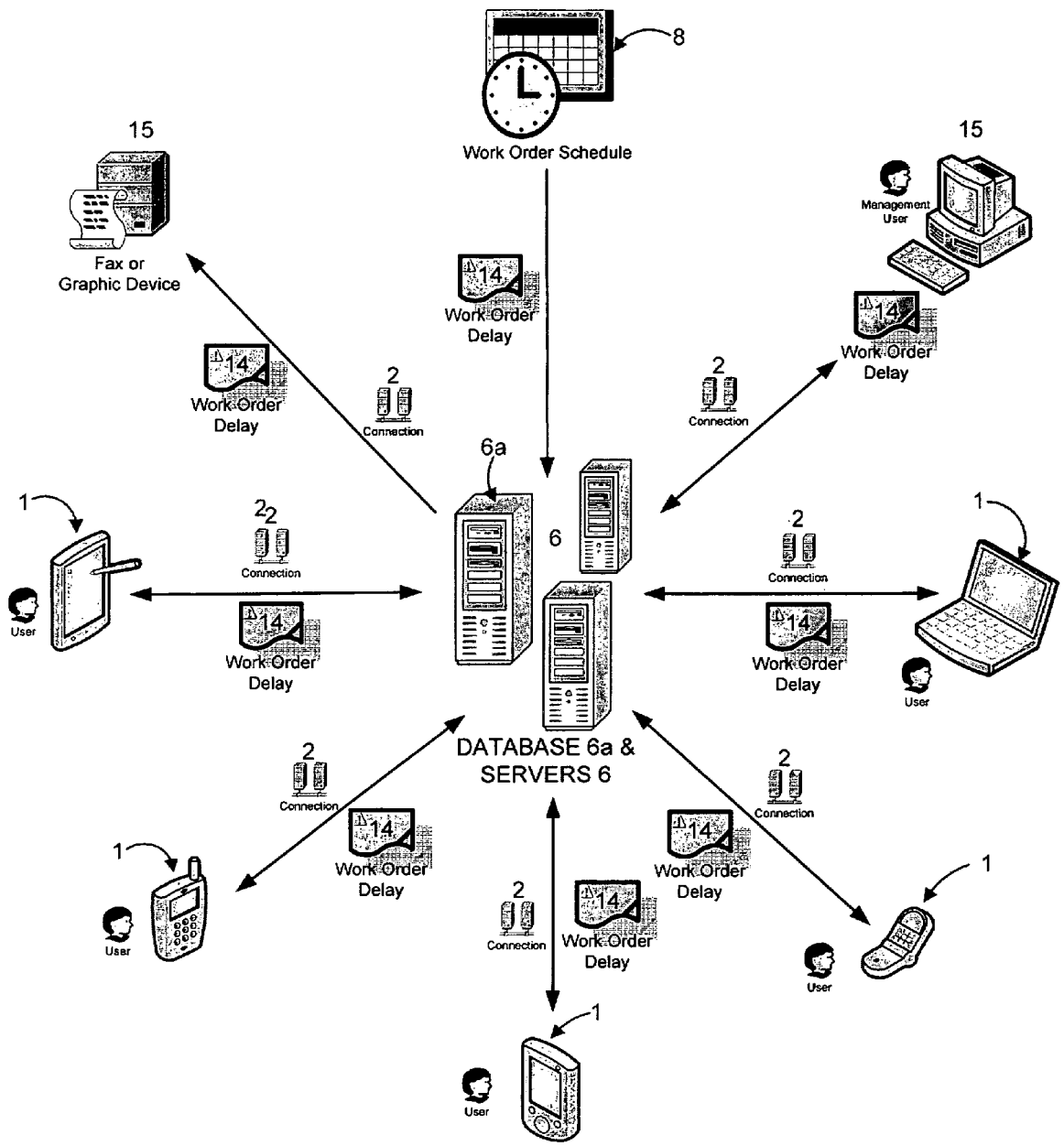
FIG. 5 is a flow diagram showing automatic notification of designated system users of any delays in completing work orders on time in the dynamic system according to the present invention.

FIG. 5 illustrates automatically notifying users at the non-portable devices 15 and/or portable devices 1 of any delays in completing the work orders 10 on time based on the work order schedules 8 according to the present invention. As shown in FIG. 5, once the servers 6 receive a specific status of the work (e.g., a field worker arrived at the job location late or the field worker has not scanned out of the job location) from the tracking device 11 or the portable device 1 as discussed above in connection with FIG. 4, the servers 6 utilizing the database 6a automatically determine that there is a delay in the progress of the work (or any other work progress information) and automatically transmits such work order delay information 14 over the Internet or other wired or wireless connections 2 to the portable devices 1 and/or the non-portable devices 15, via, e.g., email, fax, and/or graphic representation and/or sound utilizing computers and/or devices, etc. Such notifications can happen in real time, or when the non-portable devices 15 and/or portable devices 1 connect with the servers 6. For instance, the updates can happen in real time so that whenever a user accesses the servers 6 or the database 6a, the user can obtain current information.

Figure 6:
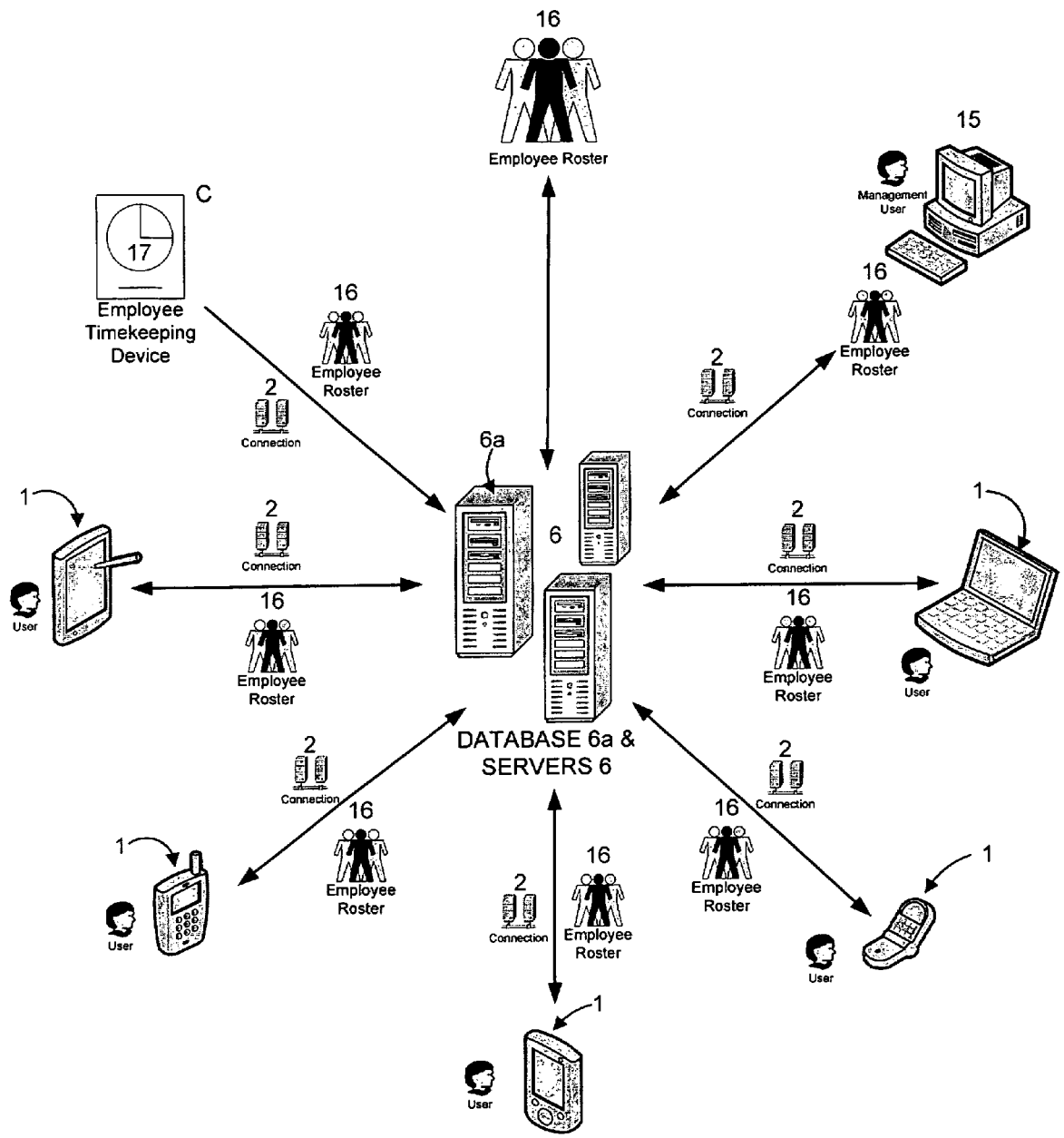
FIG. 6 is a flow diagram of automatically sending and/or receiving employee rosters utilizing portable devices in the dynamic system according to the present invention.

FIG. 6 illustrates an example of an operation of using and communicating employee records in the dynamic system according to the present invention.

As shown in FIG. 6, employee timekeeping data for each employee is automatically collected by an employee timekeeping device 17 and/or portable device 1 and the system creates employee rosters 16 using such information. The employee roster 16 includes a schedule of each employee, e.g., who came to work, location of each employee, who is absent, etc. The employee rosters 16 can be automatically created by the servers 6 utilizing the database 6a from raw employee timekeeping data, and/or by the employee timekeeping devices 17, and/or by the portable or non-portable devices 1, 15. For instance, the employee roster 16 can be created by the system automatically using scheduled employee work hours and work order 10 requirements, and can be tracked by the dynamic system to help ensure adequate allocation of labor for each of the assigned work orders 10. The employee timekeeping devices 17 can be, but are not limited to, clock-in/clock-out equipment such as fingerprint readers, magnetic stripe readers, barcode readers, retinal scanners and/or PDAs equipped with similar readers along with security devices intended to permit authorized personnel access to secure areas.

As employees clock in or out, the servers 6 (including the database 6a) automatically update the employee rosters 16 and the servers 6 automatically sends the employee rosters 16 from the database 6a to the portable and non-portable devices 1, 15 using the connections 2, via, e.g., email, fax, and/or graphic representation utilizing computers and/or devices, etc. Such transmission may occur in real time, periodically, or upon a request from a user. Accordingly, a user at the portable device 1 or the non-portable device 15 can readily know the exact status of each employee.

Figure 7:
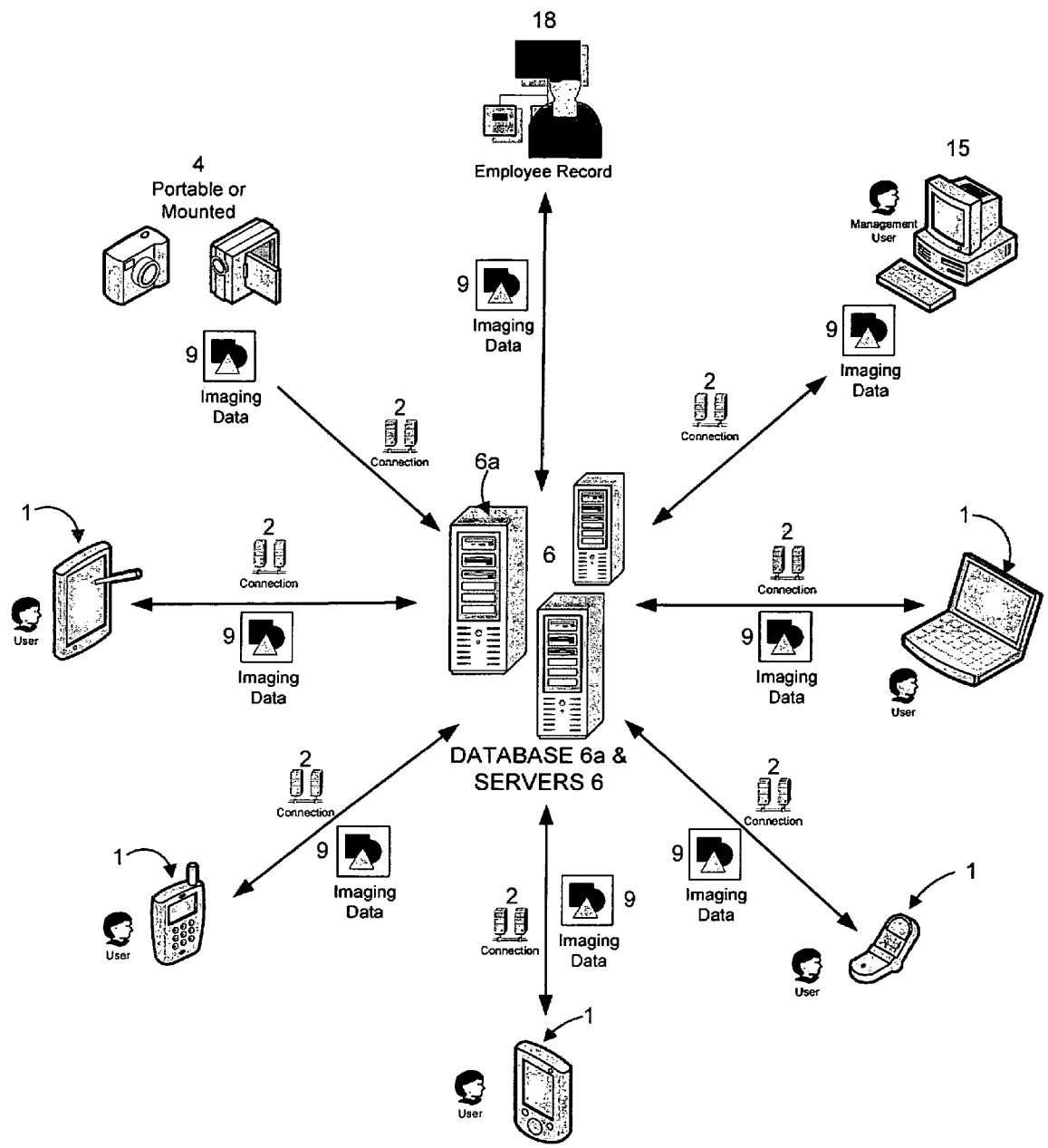
FIG. 7 is a flow diagram of automatically sending and/or receiving imaging data that is stored directly into an employee record utilizing portable devices in the dynamic system according to the present invention.

FIG. 7 illustrates an example of an operation of communicating employee imaging data 9 in the dynamic system according to the present invention.

As shown in FIG. 7, employee imaging data 9 (e.g., a picture of an employee) is captured and/or created using the portable devices 1 and/or the imaging devices 4, and transmitted over the Internet or other wired or wireless connection 2 to and from the servers 6 (including the database 6a). The servers 6 utilizing the database 6a automatically store the employee imaging data 9 directly into employee records 18. For instance, when a new worker arrives at a job location, a picture of the worker (along with other personnel information of the new worker) can be entered by the portable device 1 and/or the imaging device 4 at the job location, and automatically sent to the servers 6. The servers 6 can store the picture and personal information of the new worker and create a new employee record file for that employee in the database 6a. That is, without having to register each new employee at a central office first, the new employees can be registered from remote locations, and their information can be automatically stored at the central office using the dynamic system of the present invention. Any changes to the employee's personal information can also be stored in the database 6a in this manner. Thus the dynamic system automatically registers, keeps and updates personnel information for each employee regardless of employee location.

Also, the employee records 18 (including the imaging data 9) can be sent over the Internet or other wired or wireless connections 2 amongst the database 6a, the portable devices 1 and the non-portable devices 15, via, e.g., email, fax and/or graphic representation utilizing computers and/or devices, etc. Accordingly, the employee records 18 can be automatically communicated to provide positive identification of employees for security and other business purposes as well as any training certificates and/or professional certifications acquired by employees to facilitate personnel documentation requirements.

Figure 8:
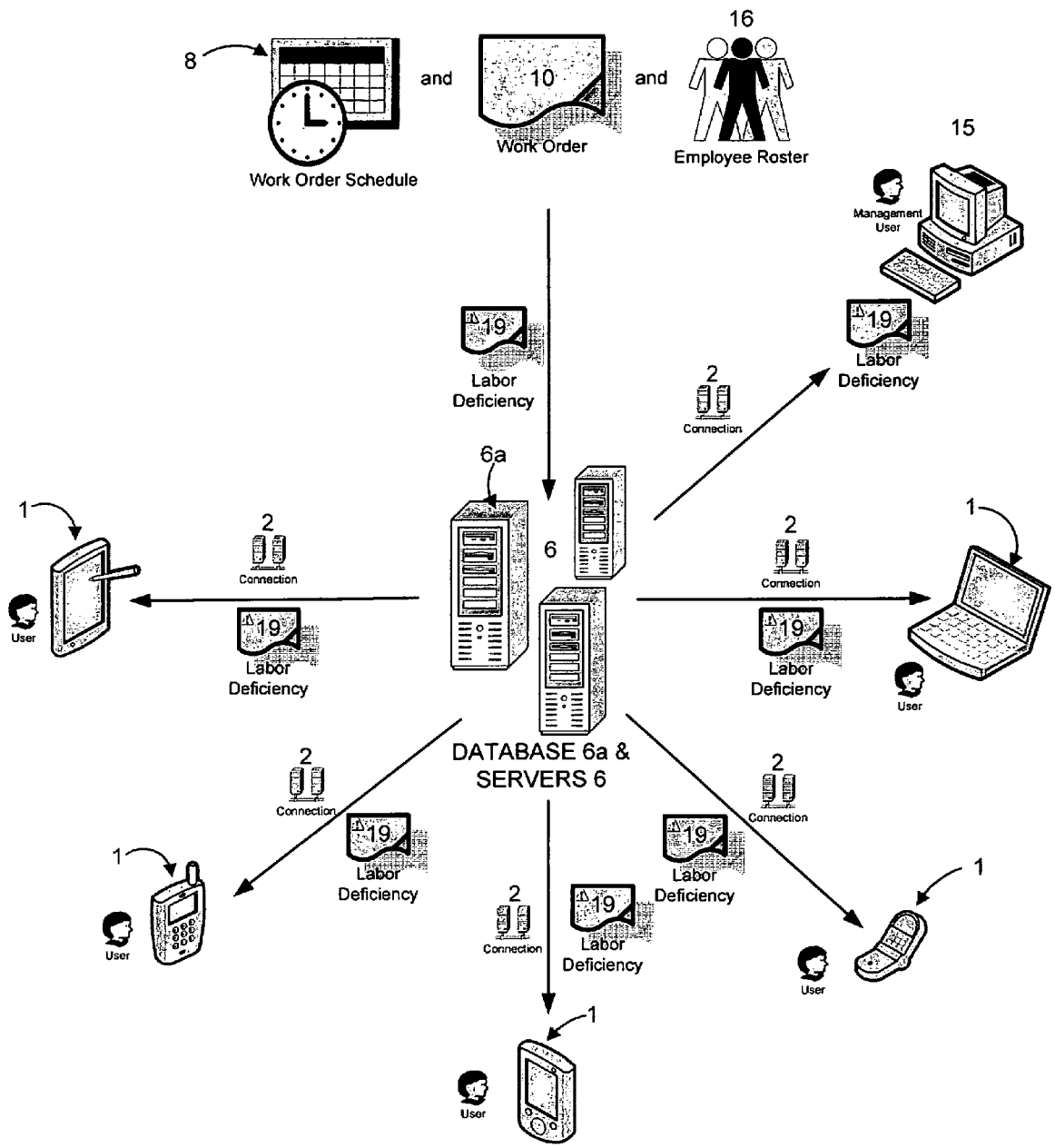
FIG. 8 is a flow diagram showing automatic notification of designated system users of any deficiencies in required labor resources in the dynamic system according to the present invention.

FIG. 8 illustrates automatically notifying the non-portable devices 15 and/or portable devices 1 of any deficiencies (19) in required labor resources based on the work order schedules 8, the work order 10 labor requirements, and the employee rosters 16 as they are tracked and computed by the servers 6 utilizing the database 6a and communicated over the Internet or other wired or wireless connections 2 to the portable and non-portable devices 1 and 15, via, e.g., email, fax, and/or graphic representation and/or sound utilizing computers and/or devices, etc. Such notifications can happen in real time, or when the non-portable devices 15 and/or portable devices 1 connect 2 with the servers 6, or upon request.

For instance, the servers 6 utilizing the database 6a compare the work order schedules 8, the specification or requirements of the work orders 10, and the employee rosters 16, and assign appropriate employees to carry out the work orders. The work order schedules 8 can be updated to include the assignment of employees for each task. Also the servers 6 utilizing the database 6a can review the current work order schedules 8 in view of the work orders 10 and the employee rosters 16 (e.g., who is available, who is absent, etc.) and determine if any changes may be needed to complete the work. If the dynamic system determines that there is a deficiency in the number of workers currently available to complete a particular work order based on the analysis, then the servers 6 utilizing the database 6a can reassign or swap the employees to the works and/or reschedule the works, and can communicate such information (e.g., labor deficiency information 19) to any of the portable devices 1 (e.g., at the job locations, etc.) and the non-portable devices 15 (e.g., at the central office). As a result, a manger or worker can know at all times how the job should be carried out in the future, and if any additional members will join to complete the job.

Figure 9:
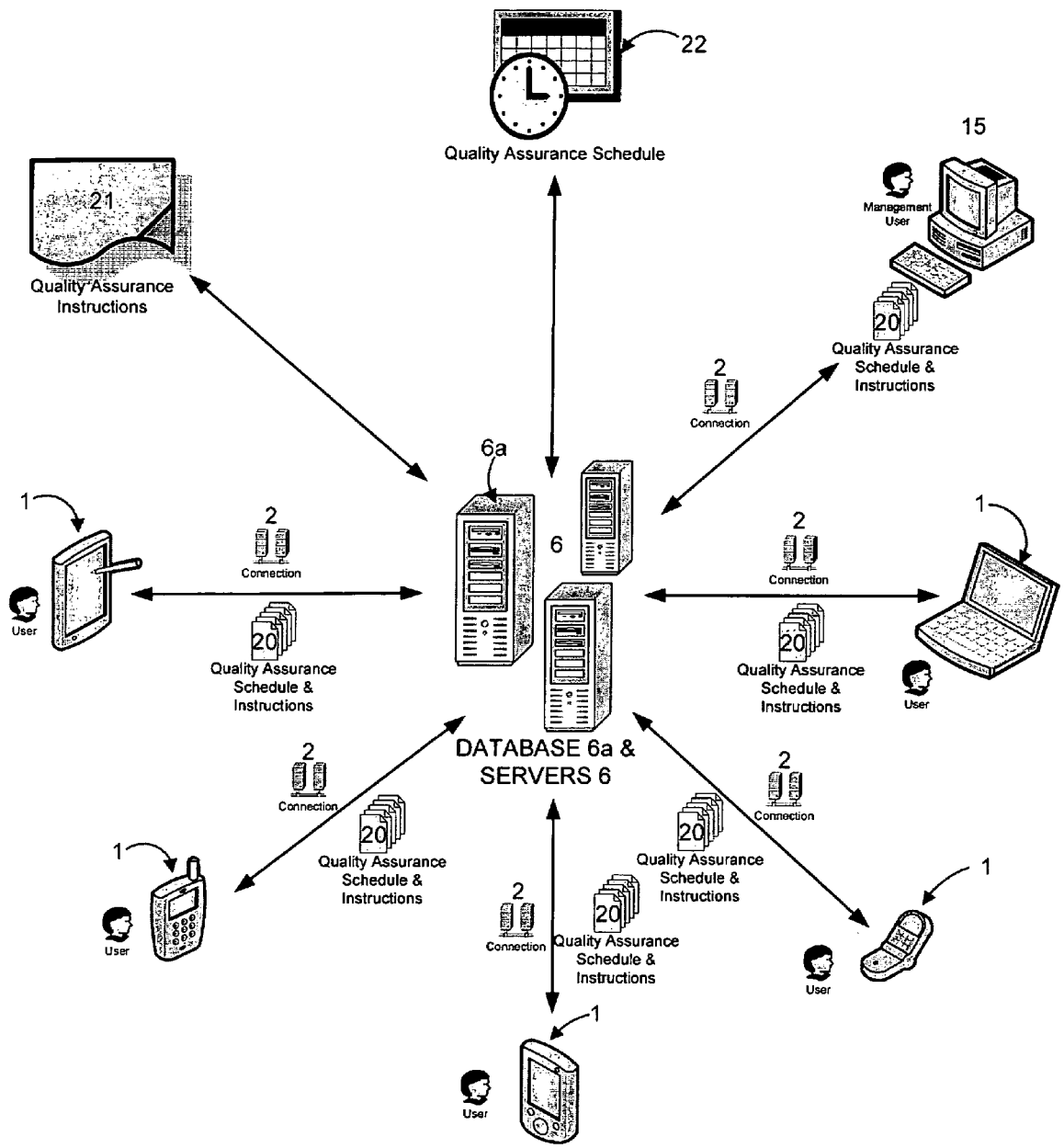
FIG. 9 is a flow diagram showing automatic sending and/or receiving quality assurance instructions, including quality assurance schedules, utilizing portable devices in the dynamic system according to the present invention.

FIG. 9 illustrates an example of an operation of automatically communicating quality assurance (quality control) information 20 amongst the servers 6 (including the database 6a), the portable devices 1 and the non-portable devices 15 via the connections 2 according to the present invention. FIG. 9 is similar to FIG. 2, but in FIG. 9, the quality assurance information 20 is communicated.

As shown in FIG. 9, the quality assurance information 20 (e.g., quality assurance instructions 21 providing quality control inspection instructions, quality assurance schedules 22 providing schedules of the quality control inspections, updates or changes thereof, etc.) is information about the quality control inspections to be performed once certain works have been finished, so as to ensure that the finished works meet certain criteria and requirements. In some sense, the quality control inspection can be considered a specific type of work, i.e., a work to be completed by an inspector. Not all work may require quality control inspections.

Similar to the way the work orders, work order instructions, and work order schedules are generated in connection with FIGS. 2-8, the dynamic system (e.g., the servers 6 (including the database 6a) in communication with the portable or non-portable devices 1, 15) generates the quality assurance information including the quality assurance instructions 21 and the quality assurance schedule 22, and stores it in the database 6a (and/or their respective storage units). Such information is also updated in real time or periodically, and automatically communicated to any of other portable and non-portable devices 1 and 15 over the Internet or other wired or wireless connections 2. The portable and non-portable devices 1 and 15 can automatically generate, capture, store, translate, calculate and/or send the quality assurance information 20 over the Internet or other wired or wireless connections 2 to the database 6a and/or to other portable devices 1 and/or to other non-portable devices 15, via, e.g., email, fax and/or graphic representation utilizing computers and/or devices, etc.

Quality assurance instructions 21 can include, but are not limited to, specifications, diagrams, flow charts, graphics, quality inspection methodology, quality assurance work flow, work change order updates, and/or critical inspection criteria. Quality assurance information 20 is dynamic and can be updated automatically, periodically, in real time, upon request, and/or whenever a connection 2 to the system is made.

Accordingly, in addition to the processes of FIGS. 2-8, the dynamic system of the present invention can also allow the quality assurance information 20 to be communicated amongst the various users of the system, automatically, periodically, in real time, and/or upon request, such that the inspectors (users) and others can use such information to carry out the inspections, and communicate quality assurance status and other information regarding the inspections to the servers 6 (including the database 6a) and other users at remote or central locations.

Figure 10:
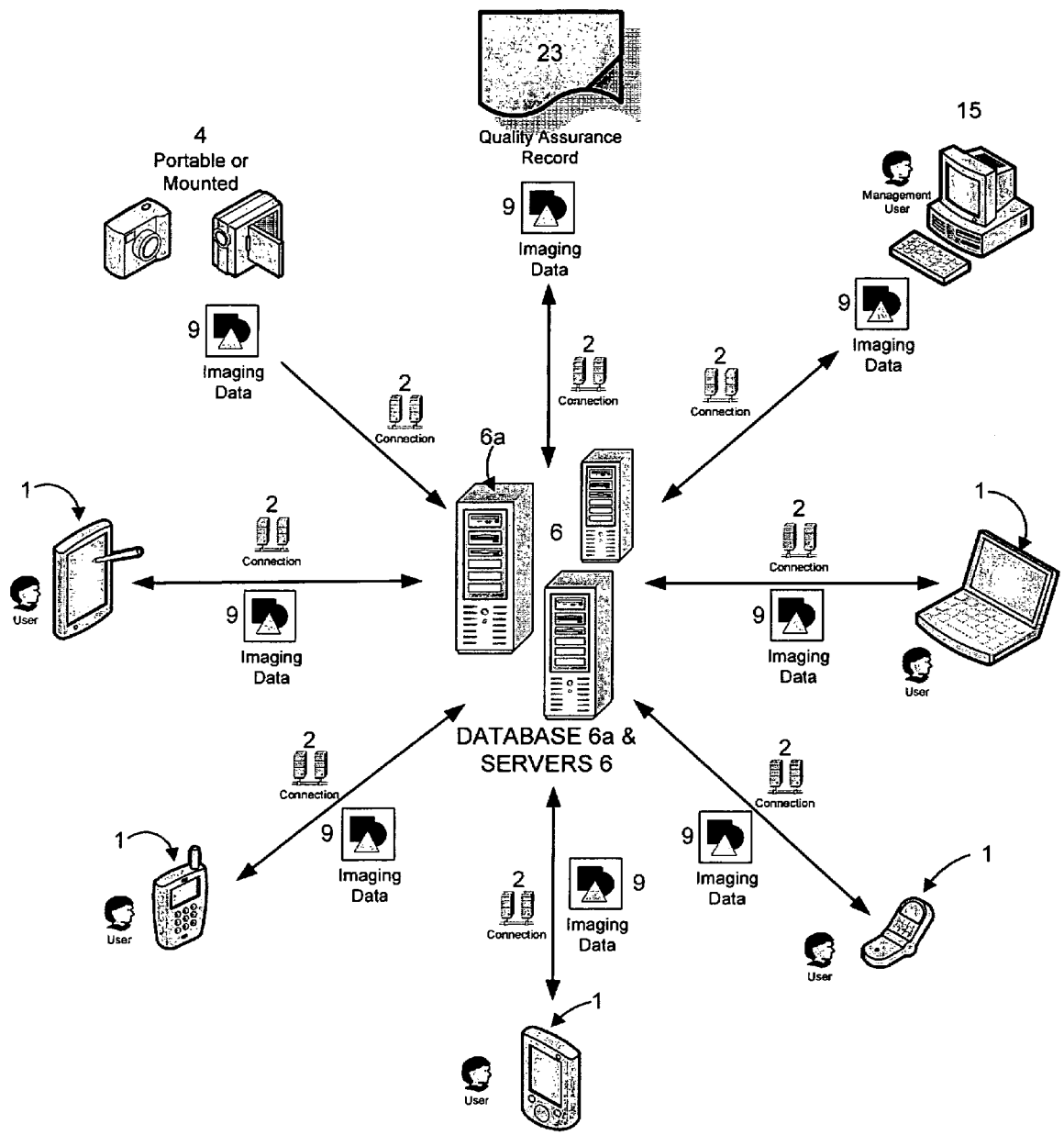
FIG. 10 is a flow diagram of automatically sending and/or receiving imaging data that is stored directly into a quality assurance record utilizing portable devices in the dynamic system according to the present invention.

FIG. 10 illustrates the automatic flow of imaging data 9 over the Internet or other wired or wireless connections 2 to and from the servers 6 (including the database 6a), which is captured and/or created utilizing the portable devices 1 and/or imaging devices 4, wherein the imaging data is stored directly into quality assurance records 23 and which can be sent over the Internet or other wired or wireless connections 2 to/from the portable devices 1 and/or non-portable devices 15, via, e.g., email, fax and/or graphic representation utilizing computers and/or devices, etc. The dynamic system can recognize quality assurance imaging data 9 and store it in individual quality assurance records 23 automatically to provide clarified quality assurance instructions utilizing pictures, schematics, diagrams and/or graphics that can improve quality inspections, to clarify quality inspection requirements, to provide examples of good or poor workmanship, to document on-site work conditions, to document inspection progress, to highlight safety hazards, and/or to provide proof of work completion. For instance, an inspector can take a picture of the job finished/unfinished and send it (imaging data 9) from his portable device 1 at the job site to the servers 6 and/or other portable or non-portable device 1, 15. The servers 6 automatically store the received picture (imaging data 9) as part of a quality assurance record 23 for the inspected work in the database 6a, which can be accessed and used by other workers, other inspectors, managers, etc. The quality assurance records 23 are updated in real time, periodically, automatically, and/or upon request.

Figure 11:
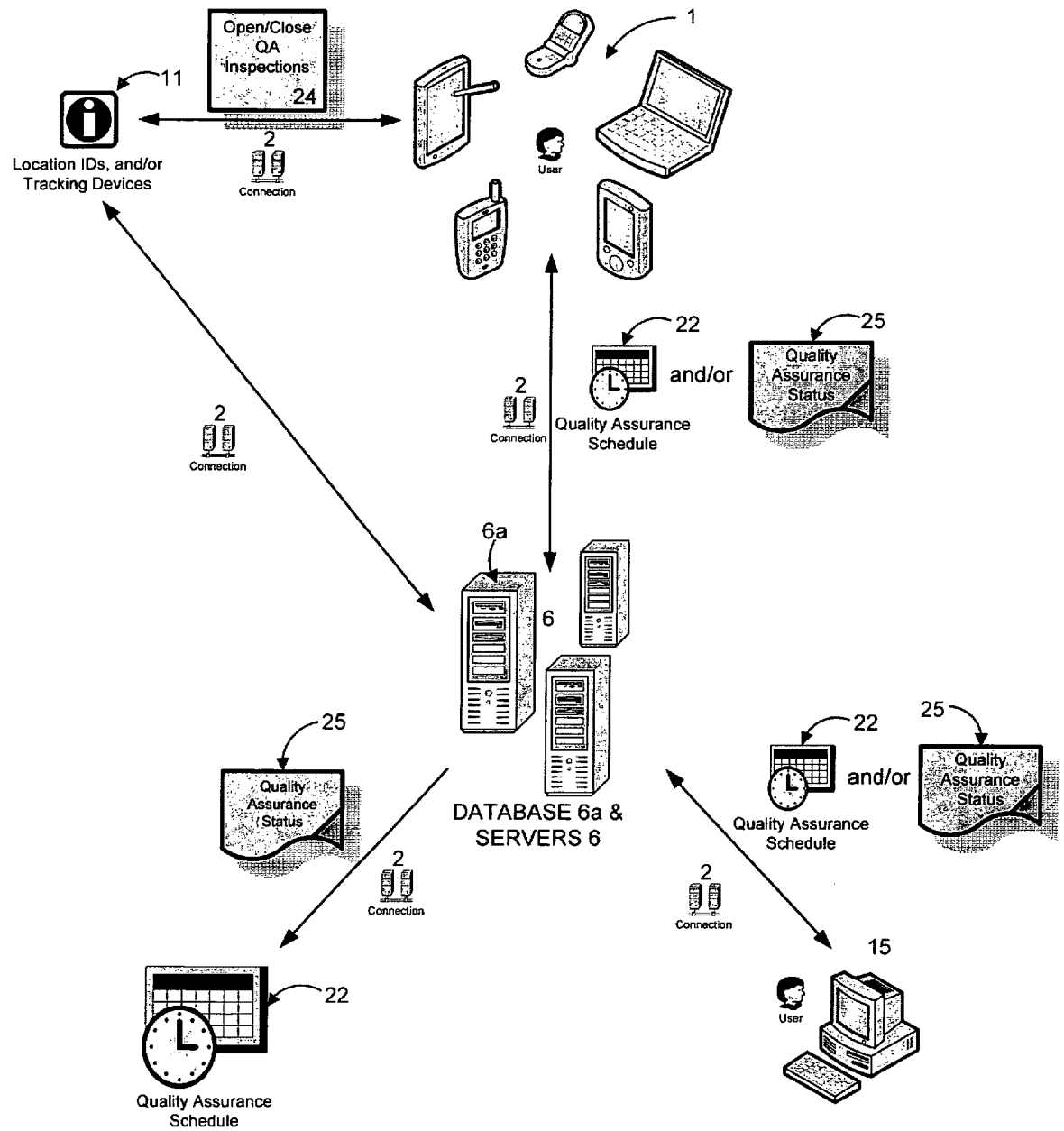
FIG. 11 is a flow diagram showing automatic opening/closing scheduled and unscheduled quality insurance inspections utilizing portable devices, and quality assurance schedules being automatically updated utilizing portable devices.

FIG. 11 illustrates an example of an operation of automatically opening and closing scheduled and/or unscheduled quality assurance inspections (inspection orders) 24 utilizing the portable devices 1 and the location identification tags and/or tracking devices 11 according to the present invention.

As shown in FIG. 11, the dynamic system provides changing quality assurance inspection status information 25 (e.g., status on each inspection, etc.) and/or updating the quality assurance schedules 22, and automatically sending/receiving the quality assurance inspection status information 25 and/or quality assurance schedules 22 over the Internet or other wired or wireless connections 2 to and from the servers 6 (including the database 6a), and/or the portable devices 1 and/or the non-portable devices 15, via, e.g., email, fax and/or graphic representation and/or sound utilizing computers and/ or devices, etc.

The quality assurance status information 25 can be automatically sent to the servers 6 (including the database 6a), directly or via the non-portable devices 15 and/or portable devices 1 from the location tags and/or tracking devices 11 identifying work progression such as Requested (inspection requested), Open (inspection has begun), On-Hold (inspection is on hold), Cancelled (inspection has been cancelled), Needs Improvement (finished job needs improvement), Project Work, Failed (inspection failed), and Completed (inspection passed and thus the work has been completed fully). Other examples of the different states of the inspections can be used and communicated amongst the servers 6, the portable devices 1, the non-portable devices 15, and the tracking devices 11.

For instance, similar to the processes involved with the work order operations of FIG. 4, in FIG. 11, a user (e.g., an inspector, etc.) can input his ID information along with any other information (e.g., inspection start time, location, equipment identification, etc.) to the servers 6 using the tracking device 11 and/or the portable device 1. Then the servers 6 can store such information in the database 6a, and can automatically generate and/or update the quality assurance schedule 22 based on the received information. The user can also input a status of quality control inspection as the quality assurance status information 25 to the servers 6, which can be automatically stored and updated in the database 6a. Any portable device 1 and non-portable device 15 can access the quality assurance status information 25 and other information (e.g., quality assurance schedule 22, quality assurance record 23, etc.) from the database 6a. Communications and updates of the quality assurance information 25 and other information can be made in real time, periodically, automatically, and/or upon request.

Accordingly, the present invention systematically allows inspectors to easily carry out appropriate inspections and provides status on such inspections back to the dynamic system, which allows the servers 6 to automatically utilize and update all relevant information stored in the database 6a based on the received information. As such, all current information pertaining to work and inspections can be automatically generated, updated and made available, for access by all users of the dynamic system at any time and place.

Figure 12:
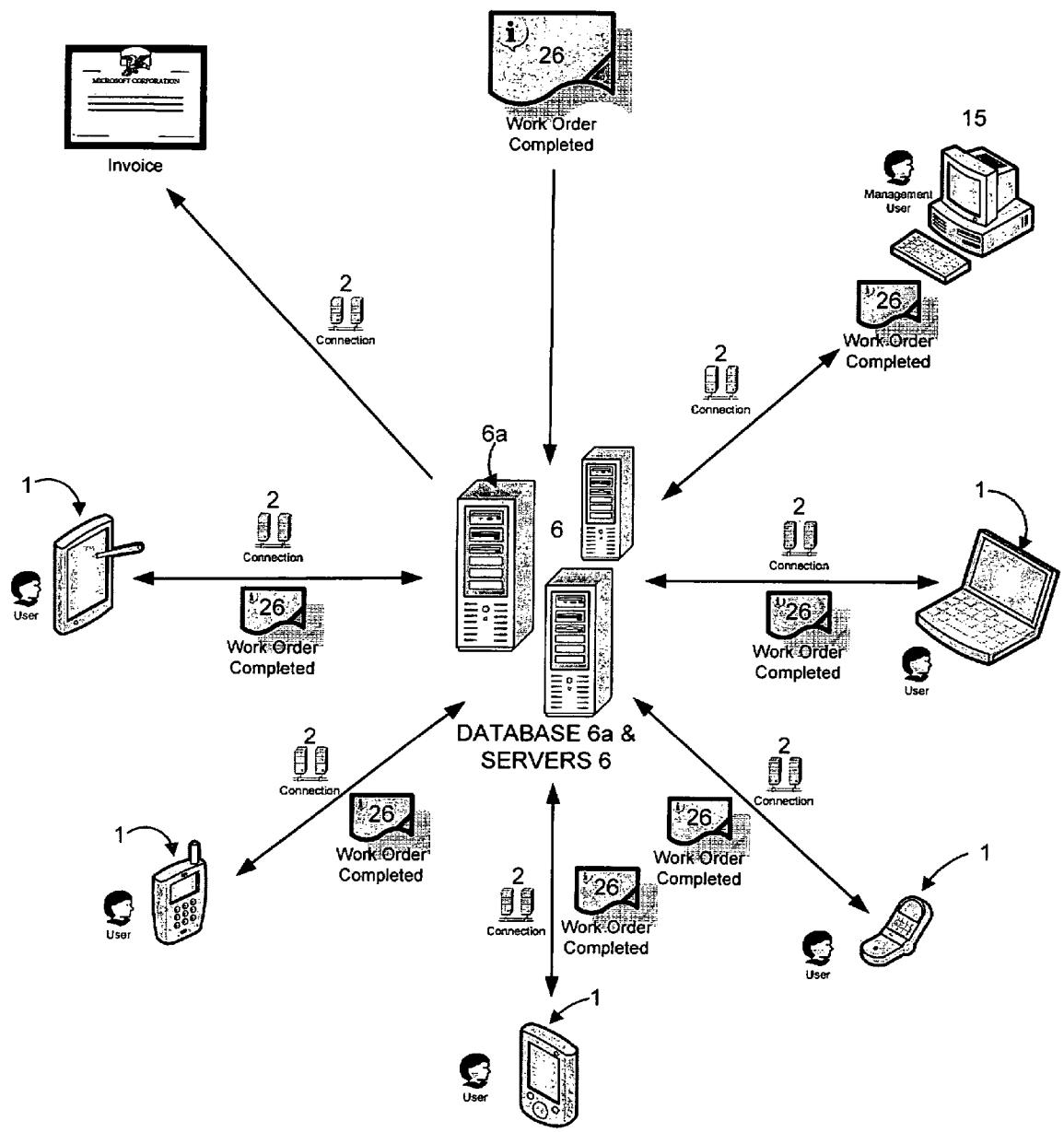
FIG. 12 is a flow diagram showing quality assurance inspectors and other designated users being automatically notified that a work order is completed and can be inspected in the dynamic system according to the present invention.

FIG. 12 illustrates an example of an operation of automatically notifying the non-portable devices 15 and/or portable devices 1 that work has been completed according to the present invention.

As shown in FIG. 12, once a worker finishes the work according to the work order 10, then the worker can indicate to the servers 6 (including the database 6a) and/or other users (1, 15) in the system that the work order is completed (work is finished) (26) using the connections 2, via, e.g., email, fax, and/or graphic representation and/or sound utilizing computers and/or devices, etc. In addition, if applicable, such work completed information 26 can indicate that the finished work is thus now ready for an inspection. As a variation, such work completed information 26 can indicate that the work is finished and the finished work has passed the inspection, if the inspection is conducted. Notifications can happen in real time, periodically, or when the non-portable devices 15 and/ or portable devices 1 connect 2 with the servers 6.

The servers 6 utilizing the database 6a can use the received work completed information 26 to create/update the quality assurance schedule 22 and instructions 21 as discussed in connection with FIG. 9. For instance, if the work has been completed, then the servers 6 utilizing the database 6a automatically schedule an inspection of the completed work (if needed), which will be reflected in the quality assurance schedule 22. Also, if the information 26 indicates that the work has passed the inspection (i.e., the work is completed satisfactorily), then the servers 6 utilizing the database 6a can also automatically update the quality assurance schedule 26 accordingly, e.g., by removing the inspection since it has been completed satisfactorily. In addition, the servers 6 utilizing the database 6a (or some other entity) can automatically or upon request generate an invoice for the completed work and/or the inspected work, whereby the dynamic system is used to manage billing aspects of the work/inspection operation.

Figure 13:
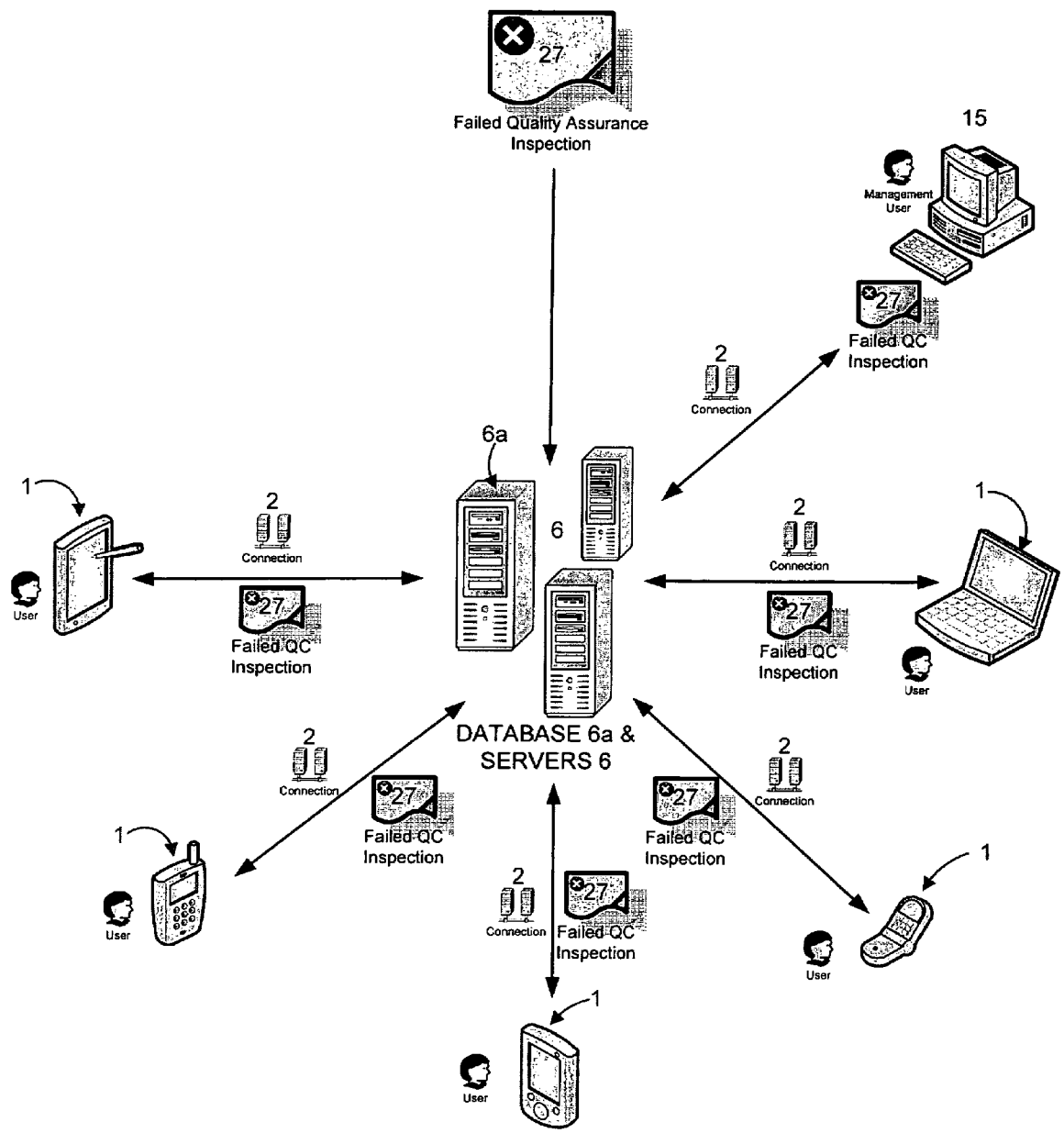
FIG. 13 is a flow diagram showing automatic notification of designated users of failed quality assurance inspections in the dynamic system according to the present invention.

FIG. 13 illustrates an example of an operation of automatically notifying the non-portable devices 15 and/or portable devices 1 of failed quality assurance inspections 27 as tracked by the servers 6 (including the database 6a) and communicated over the Internet or other wired or wireless connections 2 to the portable devices 1 and/or to the non-portable devices 15 via, e.g., email, fax, and/or graphic representation and/or sound utilizing computers and/or devices, etc. Notifications can happen in real time, or when the non-portable devices 15 and/or portable devices 1 connect 2 with the servers 6. That is, if an inspection fails, then the inspector at the inspection site can enter such inspection result to the servers 6 using the portable device 1, and such information can then be stored in the database 6a and distributed to other devices 1, 15, automatically, periodically, in real time, and/or upon request. Other information stored in the database 6a can be adjusted in view of the inspection result information.

Figure 14:
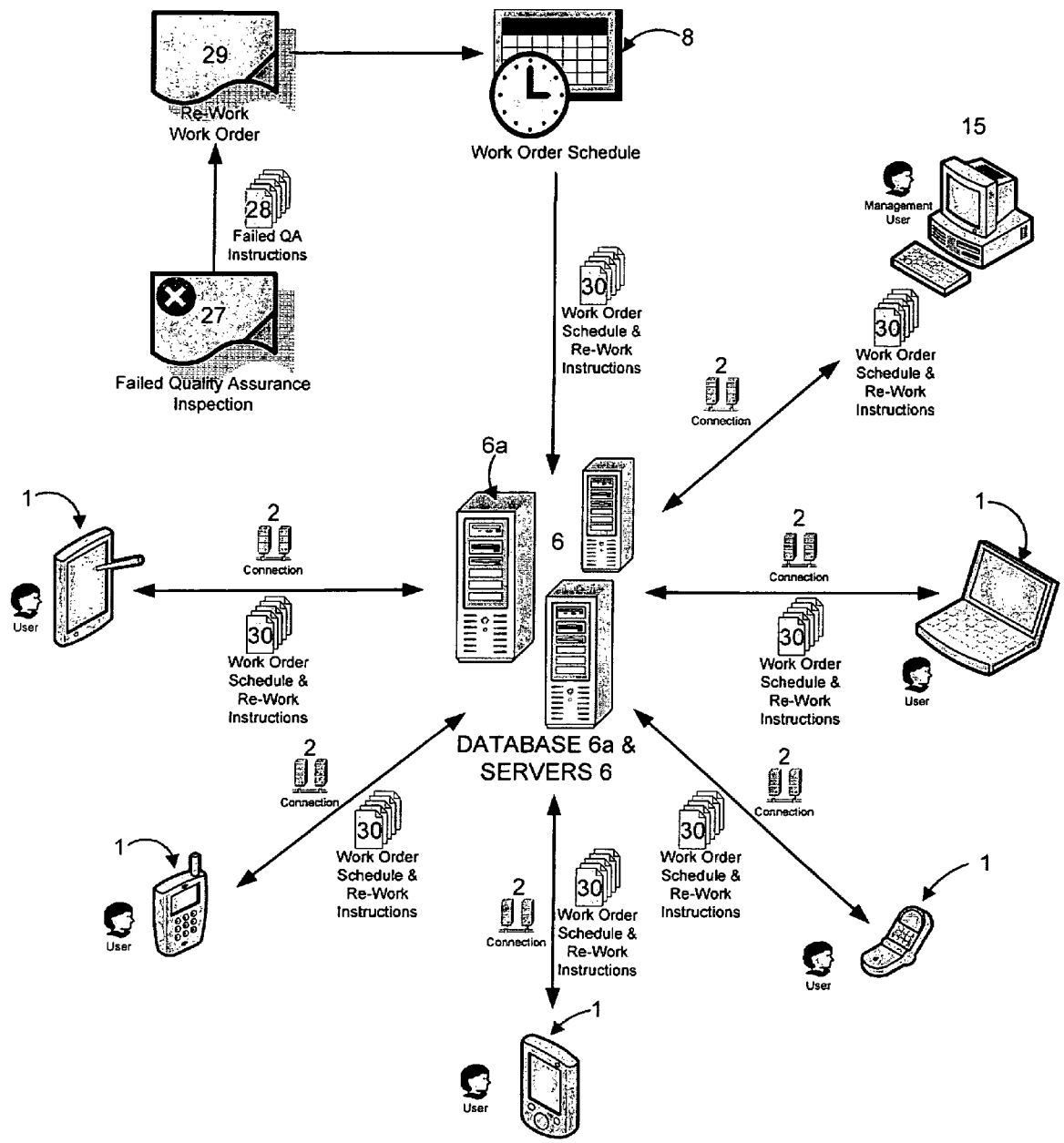
FIG. 14 is a flow diagram showing automatic scheduling of re-work work orders upon a failed quality assurance inspection in the dynamic system according to the present invention.

FIG. 14 illustrates an example of an operation of automatically scheduling a re-work work order 29 based upon the failed quality assurance inspection information 27 according to the present invention. The failed quality assurance inspection information 27 indicates that a particular work has failed an inspection, and can include inspection information such as the type of inspection conducted, the type and location of the inspected work, the name of the inspector, the description of the corrective action, etc. Failed quality assurance instructions 28 can include the result of the inspection, pictures, etc. A re-work work order 29 is a work order to carry out a needed corrective action to complete the original work satisfactorily.

As shown in FIG. 14, when the failed quality assurance inspection information 27 is logged in the database 6a (e.g., by the operation of FIG. 13), a corrective action is automatically generated in the form of re-work order instructions 30. The servers 6 utilizing the database 6a or the devices 1, 15 can automatically generate corrective action, based on the failed quality assurance inspection information 27, failed quality assurance instructions 28, which determines the basis for the corrective action required by the re-work work order 29. The re-work work order 29 can be combined with or scheduled in the work order schedules 8 to generate the re-work order instructions 30, which include instructions on what needs to be done to pass the inspection and complete the work satisfactorily. For instance, the servers 6 (including the database 6a) can automatically assign next available workers or the workers who did the work originally at their next available time/date, to carry out the re-work work order 29. Or the servers 6 (including the database 6a) can automatically assign next higher level workers to carry out the re-work work orders 29 to ensure that the re-done work will pass the inspection. Also the work order schedule 8 can include the time and date by which the re-work must be completed and/or must pass the inspection, if required. Other variations are possible.

The re-work order instructions 30 (which can include the work order schedule 8, re-work work orders 29 (FIG. 15), etc.) can be automatically issued by the servers 6 and communicated over the Internet or other wired or wireless connections 2 to the portable devices 1 and/or to the non-portable devices 15 via, e.g., email, fax, and/or graphic representation and/or sound utilizing computers and/or devices, etc. Or such re-work order instructions 30 can be generated by a portable device 1 or a non-portable device 15 and sent to the servers 6 (e.g., for storage in the database 6a) or to other portable or non-portable devices 1, 15. In this way, a crew leader or other user in a remote location can obtain complete and detailed re-work order instructions 30 (without having to come into the central office) and carry out the necessary tasks, which can save time and other resources significantly.

Accordingly, in the dynamic system, the re-work work orders 29 are issued and scheduled automatically to provide specific corrective actions required as identified by the failed quality assurance instructions 28. To provide subjective details needed to correct deficiencies, the failed quality assurance instructions 28 and/or the re-work work orders 29 can be automatically included in the detailed re-work order instructions 30 and/or the schedule 8.

Figure 15:
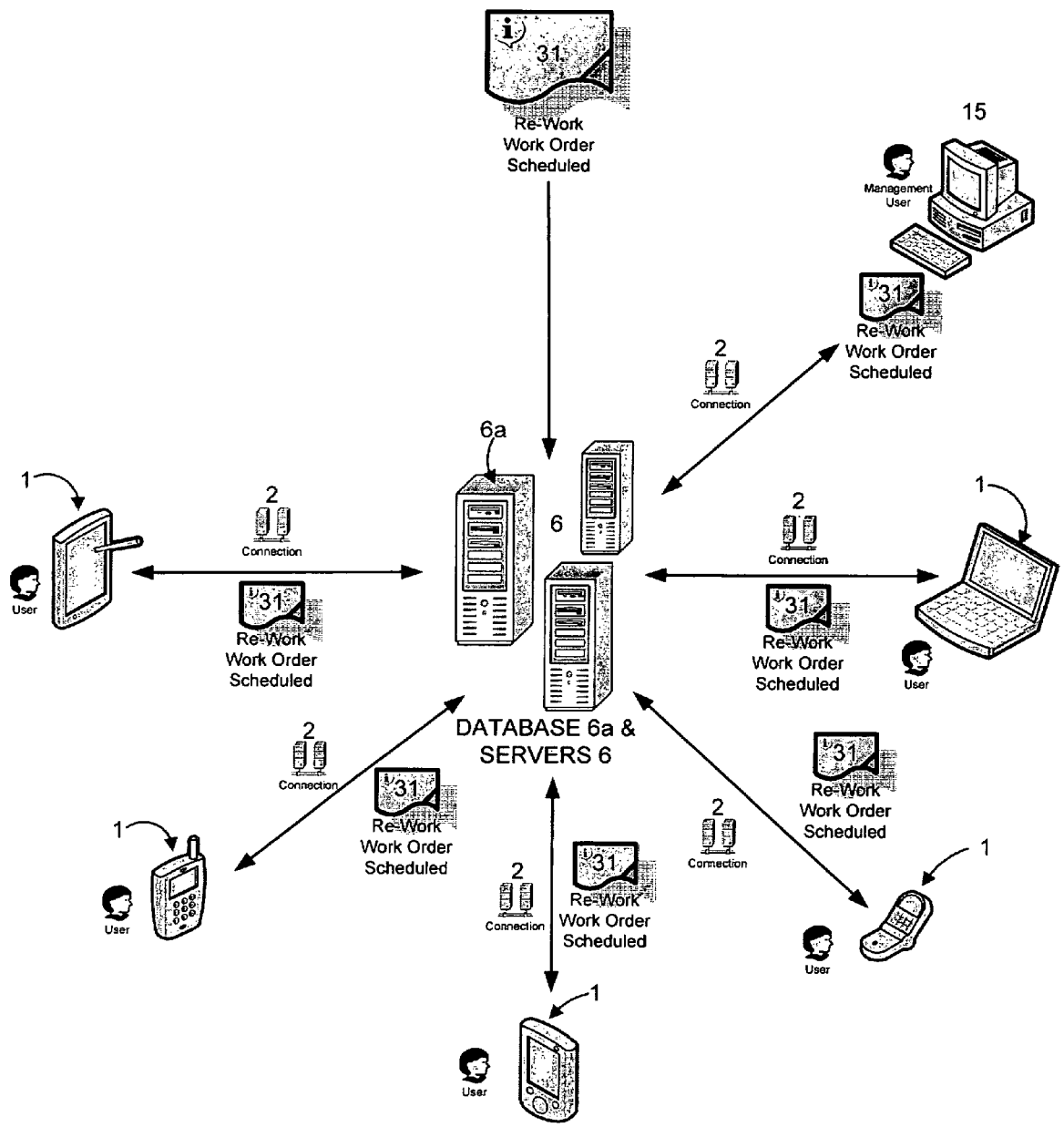
FIG. 15 is a flow diagram showing automatic notification of designated users of a scheduled re-work work order in the dynamic system according to the present invention.

FIG. 15 illustrates an example of an operation of automatically notifying the non-portable devices 15 and/or portable devices 1 of a scheduled re-work work order 31 as tracked by the servers 6 (including the database 6a) and communicated over the Internet or other wired or wireless connections 2 to the portable devices 1 and/or to the non-portable devices 15, via, e.g., email, fax, and/or graphic representation and/or sound utilizing computers and/or devices, etc. Notifications can happen in real time, periodically, on demand, or when the non-portable devices 15 and/or portable devices 1 connect 2 with the servers 6. Further, once the re-work is in progress or has been completed, the operations discussed herein above, e.g., as shown in FIGS. 4-15, can be applied to the re-done work or the re-work in progress.

Figure 16:
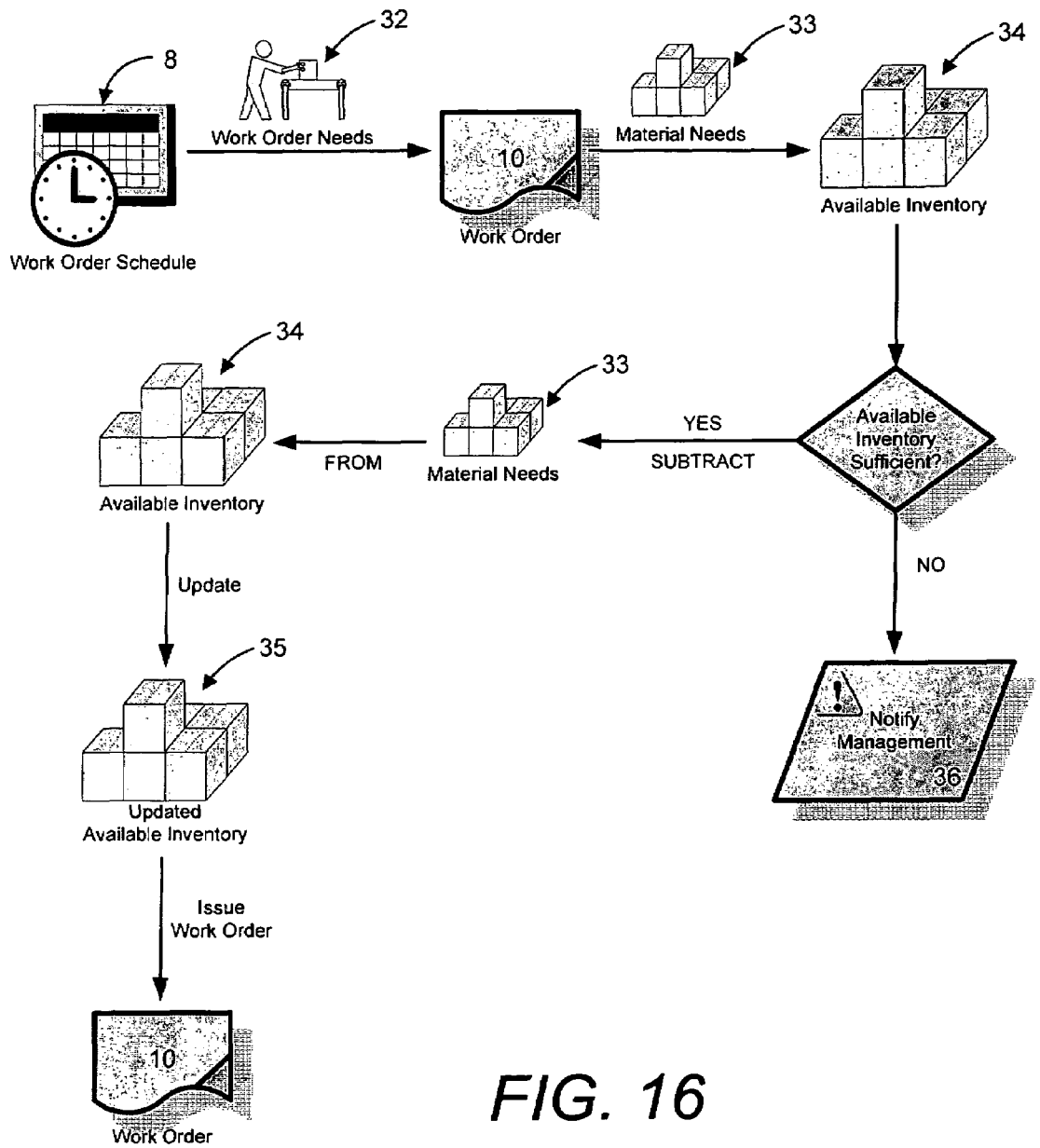
FIG. 16 is a flow diagram showing automatic updates to material inventory levels based upon work order material needs and work order material consumption history in the dynamic system according to the present invention.

FIG. 16 illustrates an example of an operation of automatically identifying material needs 33 based upon the work order schedule 8, work order needs 32, active work orders 10, and/or work order material consumption history as tracked and calculated by the servers 6 (including the database 6a or devices 1, 15) according to the present invention.

Figure 17:
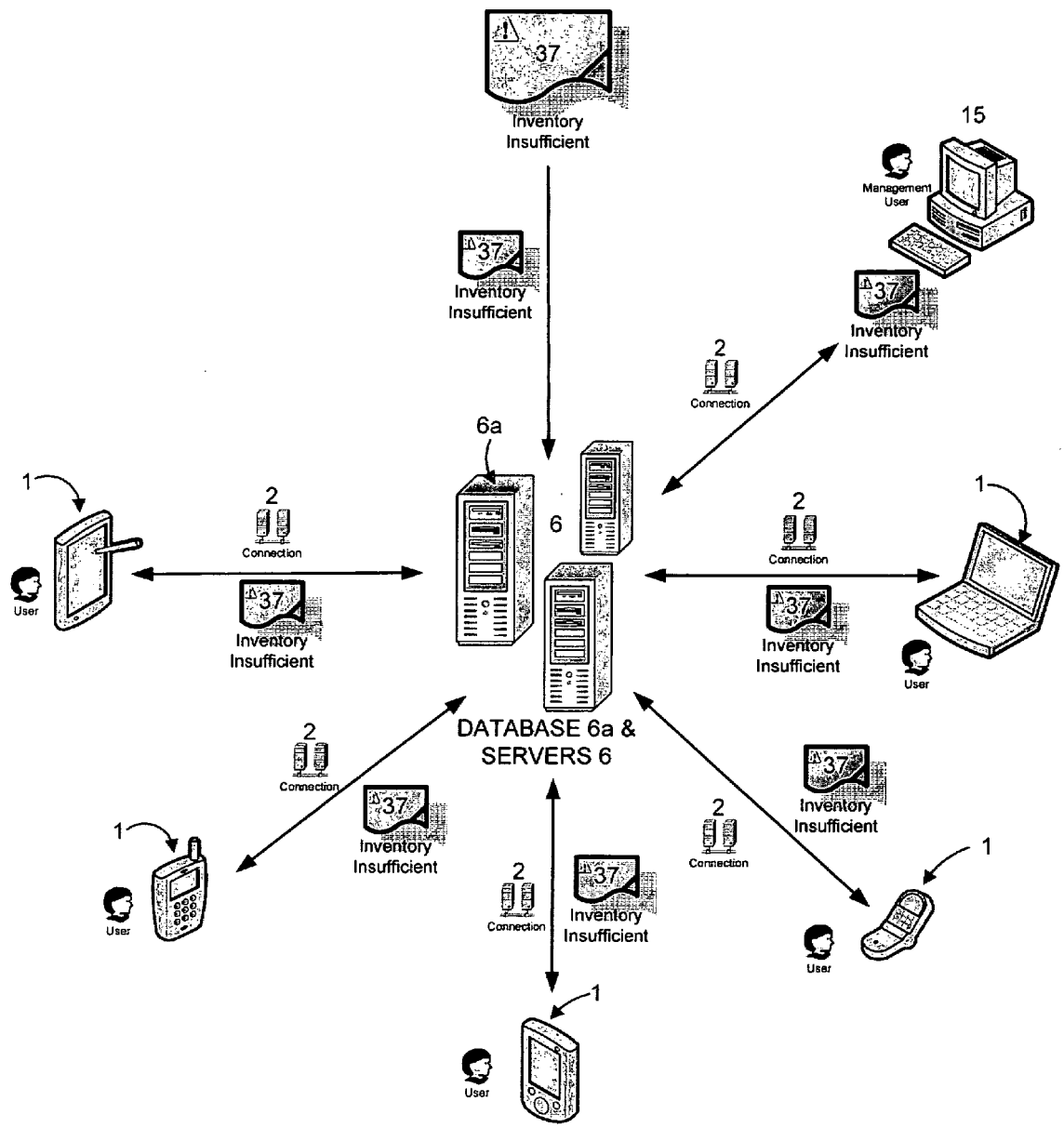
FIG. 17 is a flow diagram showing automatic identification of work orders that will be affected by low inventory levels and notification of designated users in the dynamic system according to the present invention.

As shown in FIG. 16, the servers 6 (including the database 6a or device 1, 15) determine which materials (supplies, equipment, etc.) are needed to complete each work order and include this information in the work order schedule 8 and/or the work order 10. Once the material needs 33 are identified, the servers 6 utilizing the database 6a automatically compare the identified material needs 33 to available inventory 34, which can include materials on order, to determine if adequate materials are available to complete the scheduled work orders 10. If adequate materials are available to complete the scheduled work orders 10, then the servers 6 (including the database 6a) can automatically sequester the materials that are needed and the work orders 10 can be carried out. The servers 6 utilizing the database 6a can automatically deduct the material needs 33 identified in each work order or schedule from the available inventory 34 to create updated available inventory 35 when the work orders 10 are completed. For instance, if a work is completed, then a user at the job site can scan out using the device 1, 11, at which time the servers 6 utilizing the database 6a can assume that the work is completed and the needed materials were all used, and thus automatically deduct the material needs 33 identified in the work order 10 from the available inventory 34. On the other hand, if adequate materials are not available to complete the scheduled work orders 10, the servers 6 automatically notifies (36) management or other users as shown in FIG. 17. Further, in addition to the notification, the servers 6 utilizing the database 6a can be configured to automatically send out purchase orders to appropriate vendors so as to purchase the needed materials to complete the work orders and/or to re-stock the inventory to desired levels.

FIG. 17 illustrates an example of an operation of automatically notifying the non-portable devices 15 and/or portable devices 1 of work orders that will be affected by low inventory levels 37 as tracked by the servers 6 (including the database 6a) and communicated over the Internet or other wired or wireless connections 2 to the portable devices 1 and/or to the non-portable devices 15 via, e.g., email, fax, and/or graphic representation and/or sound utilizing computers and/or devices, etc. Notifications can happen in real time, periodically, on demand, or when the non-portable devices 15 and/or portable devices 1 connect 2 with the servers 6. Accordingly, appropriate users can know the current status of the needed materials in view the current inventory and can take necessary actions.

From the foregoing description, it should be understood that an improved method and system for managing building facilities services and other work-requiring services have been shown and described, which have many desirable attributes and advantages. The system and method fully and effectively integrate the entire facility, and also groups of facilities, into a single system with minimal human intervention. The system and method also allow an automatic and total management of work to be completed as well as human and other resource allocations, considering various aspects of the needs and demands associated with the work and resources. The system and method further allow an electronic integration of all available/necessary information associated with the work, and allow communication of such integrated information to all users of the system at any time and place. Because of the superiority and advantages of the system, the present invention allows for comprehensive customization of services for each building facility or the like while maintaining efficiency, quality and organization in the management system.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

What is claimed is:

1. A computer readable medium storing therein a computer program product readable by at least one server and/or at least one portable device configured to communicate with the at least one server through a network, for dynamically managing tasks to be completed, the computer program product comprising:

computer executable code configured to generate work orders, to continuously update work orders periodically or in real time, to automatically generate and constantly update a work order schedule based on a plurality of characteristics of at least the work orders, and to automatically send and/or receive work-related information including the work order schedule and the work orders by communicating between the at least one portable device and the at least one server; and computer executable code configured to generate quality assurance instructions for quality assurance inspections, to automatically generate without a user intervention a quality assurance schedule based on at least the quality assurance instructions, and to automatically send and/or receive quality assurance information including the quality assurance schedule and the quality assurance instructions using the at least one portable device.

2. The computer readable medium of claim 1, wherein the computer program product further comprises:

computer executable code configured to automatically send and/or receive imaging data directly into a work order record using the at least one portable device.

3. The computer readable medium of claim 1, wherein the computer program product further comprises:

computer executable code configured to automatically open and close the scheduled work orders and/or unscheduled work orders using the at least one portable device.

4. The computer readable medium of claim 3, wherein the computer program product further comprises:

computer executable code configured to automatically communicate status information associated with the work ardors using the at least one portable device.

5. The computer readable medium of claim 4, wherein the computer executable code configured to automatically communicate the status information automatically notifies designated system users of any delays in completing the work orders on time.

6. The computer readable medium of claim 4, wherein the computer executable code configured to automatically communicate the status information communicates the status information among the at least one server and the at least one portable. device, periodically or in real time.

7. The computer readable medium of claim 4, wherein the status information associated with the work orders indicates one of the following:

work requested, work open, work on-hold, work cancelled, work completed, or work ready for quality control.

8. The computer readable medium of claim 4, wherein the computer program product further comprises:

computer executable code configured to automatically generate an invoice to charge for a completed work, if the status information indicates that the work is completed.

9. The computer readable medium of claim 1, wherein the computer program product further comprises:

computer executable code configured to automatically send and/or receive imaging data directly into an employee record using the at least one portable device.

10. The computer readable medium of claim 1. wherein the computer program product further comprises:

computer executable code configured to receive employee timekeeping information from an employee timekeeping device, to automatically generate employee rosters based on the employee timekeeping information, and to automatically sand and/or receive the employee rosters using the at least one portable device.

11. The computer readable medium of claim 10, wherein the computer executable code configured to automatically generate the work order schedule generates the work order schedule based on the employee rosters and The work orders.

12. The computer readable medium of claim 11, wherein the computer program product further comprises:

computer executable code configured to compare the employ rosters and the work orders, and to automatically notify designated system users of any deficiencies in required labor resources based on the comparison results.

13. The computer readable medium of claim 1, wherein the computer program product further comprises:

computer executable code configured to automatically send and/or receive imaging data directly into a quality assurance record using the at least one portable device.

14. The computer readable medium of claim 1, wherein the computer program product further comprises:

computer executable code configured to automatically open and close the scheduled quality assurance inspections and/or unscheduled quality assurance inspections using the at least one portable device.

15. The computer readable medium of claim 1, wherein the computer program product further comprises:

computer executable code configured to automatically update the work order schedule and/or the quality assurance schedule using the at least one portable device when each work order is completed.

16. The computer readable medium of claim 15, wherein the computer program product further comprises:

computer executable code configured to automatically notify inspector(s) and other designated system user(s) that the work order is completed and ready for inspection, using the at least one portable device.

17. The computer readable medium of claim 1, wherein the computer program product further comprises:

computer executable code configured to automatically communicate status information associated with the quality assurance inspections using the at least one portable device.

18. The computer readable medium of claim 17, wherein the status information associated with the quality assurance inspections indicates one of the following:

quality assurance requested, quality assurance open, quality assurance on-hold, quality assurance cancelled, re-work requested, quality assurance passed, or quality assurance failed.

19. The computer readable medium of claim 18, wherein the computer program product further comprises:

computer executable code configured to automatically schedule a re-work order to carry out a corrective action for a failed work, if the status information indicates the quality assurance failed.

20. The computer readable medium of claim 19, wherein the computer program product further comprises:

computer executable code configured to automatically notifies designated system users using the at least one portable device when the re-work order is scheduled.

21. The computer readable medium of claim 1, wherein the computer program product further comprises:

computer executable code configured to automatically update material inventory levels based on work order material needs of the work orders and/or work order material consumption history.

22. The computer readable medium of claim 21, wherein the computer program product further comprises:
computer executable code configured to automatically identify one or more work orders that will be affected by low inventory levels, if the updated material inventory levels are low, and to automatically notify designated system users of the low inventory levels.

23. The computer readable medium of claim 22, wherein the computer program product further comprises:
computer executable code configured to automatically generate purchase orders to satisfy the work order material needs.

24. A method for dynamically managing tasks to be completed, the method comprising:
generating work orders for works to be done;
automatically generating, by at least one server, a work order schedule based on at least the work orders;
automatically sending and/or receiving work-related information including the work order schedule and the work orders using at least one portable device;
generating quality assurance instructions for quality assurance inspections of the works that have been completed;
automatically generating without a user intervention, by the at least one server, a quality assurance schedule based on at least the quality assurance instructions; and
automatically sending and/or receiving quality assurance information including the quality assurance schedule and the quality assurance instructions using the at least one portable device.

25. The method of claim 24, further comprising:
automatically sending and/or receiving imaging data directly into at least one of a work order record, a quality assurance record and an employee record using the at least one portable device.

26. The method of clam, 24, further comprising:
automatically opening and closing the scheduled work orders and/or unscheduled work orders using the at least one portable device; and
automatically communicating a status of each work order using the at least one portable device.

27. The method of claim 26, further comprising:
receiving employee timekeeping information from an employee timekeeping device;
automatically generating employee rosters based on the employee timekeeping information; and
automatically sending and/or receiving the employee rosters using the at least one portable device.

28. The method of claim 27, further comprising:
comparing the employ rosters and the work orders; and
automatically notifying designated system users of any deficiencies in required labor resources based on the comparison results.

29. The method of claim 24, further comprising:
automatically opening and closing the scheduled quality assurance inspections and/or unscheduled quality assurance inspections using the at least one portable device; and
automatically communicating a status of each of the quality assurance inspections using the at least one portable device.

30. The method of claim 24, further comprising:
automatically update material inventory levels based on work order material needs of the work orders and/or work order material consumption history;
automatically identify one or more work orders that will be affected by low inventory levels, if the updated material inventory levels are low; and
automatically notify designated system users of the low inventory levels.

31. The computer readable medium of claim 1, wherein the computer program product further comprises:
computer executable code configured to automatically adjust the work order schedule based on an efficiency rating of each of employees.

32. The method of claim 24, further comprising:
automatically adjusting the work order schedule based on an efficiency rating of each of employees.

* * * * *